United States Patent
Stojanovski et al.

(10) Patent No.: US 12,089,180 B2
(45) Date of Patent: Sep. 10, 2024

(54) AVOIDING PAGING COLLISIONS IN A DEVICE WITH MULTIPLE SUBSCRIPTIONS

(71) Applicant: Apple Inc., Cupertino, CA (US)

(72) Inventors: Alexandre Saso Stojanovski, Paris (FR); Ching-Yu Liao, Portland, OR (US); Sudeep Palat, Cheltenham (GB); Sheetal Bhasin, Bangalore (IN)

(73) Assignee: Apple Inc., Cupertino, CA (US)

( * ) Notice: Subject to any disclaimer, the term of this patent is extended or adjusted under 35 U.S.C. 154(b) by 319 days.

(21) Appl. No.: 17/441,209

(22) PCT Filed: May 28, 2020

(86) PCT No.: PCT/US2020/034871
§ 371 (c)(1),
(2) Date: Sep. 20, 2021

(87) PCT Pub. No.: WO2020/243265
PCT Pub. Date: Dec. 3, 2020

(65) Prior Publication Data
US 2022/0159616 A1    May 19, 2022

Related U.S. Application Data

(60) Provisional application No. 62/853,631, filed on May 28, 2019.

(51) Int. Cl.
*H04W 60/04* (2009.01)
*H04B 7/06* (2006.01)
(Continued)

(52) U.S. Cl.
CPC ........... *H04W 68/02* (2013.01); *H04W 8/183* (2013.01); *H04W 24/08* (2013.01); *H04W 60/04* (2013.01)

(58) Field of Classification Search
CPC ....... H04W 12/72; H04W 8/18; H04W 12/06; H04W 68/00; H04W 92/08
(Continued)

(56) References Cited

U.S. PATENT DOCUMENTS

| 2014/0073366 | A1* | 3/2014 | Xing | H04W 76/28 |
| | | | | 455/458 |
| 2015/0017982 | A1* | 1/2015 | Klatt | H04W 68/00 |
| | | | | 455/434 |
| 2020/0336887 | A1* | 10/2020 | Ou | H04W 8/24 |
| 2021/0410107 | A1* | 12/2021 | Park | H04W 76/27 |

OTHER PUBLICATIONS

[No Author Listed], "3rd Generation Partnership Project; Technical Specification Group Radio Access Network; Evolved Universal Terrestrial Radio Access (E-UTRA); User Equipment (UE) procedures in idle mode (Release 15)," 3GPP TS 36.304 V15.3.0, Mar. 2019, 55 pages.

(Continued)

*Primary Examiner* — Marcus Smith
*Assistant Examiner* — Jason A Harley
(74) *Attorney, Agent, or Firm* — Fish & Richardson P.C.

(57) ABSTRACT

In an example method, a user equipment (UE) determines a first identifier assigned to the UE for use on a first wireless communications network and one or more first time slots for monitoring the first wireless communication networks. The UE determines a second identifier assigned to the UE for use on a second wireless communications network and one or more second time slots for monitoring the second wireless communication networks. The UE determines that the one or more first time slots at least partially overlap the one or more second time slots, and in response, transmits to the second wireless communications network, a request for a third identifier to be assigned to the UE for use on the second wireless communications network and/or a request that the one or more second time slots be offset by an interval of time.

19 Claims, 13 Drawing Sheets

(51) Int. Cl.
| | |
|---|---|
| *H04B 7/08* | (2006.01) |
| *H04L 5/00* | (2006.01) |
| *H04W 8/18* | (2009.01) |
| *H04W 24/08* | (2009.01) |
| *H04W 68/02* | (2009.01) |
| *H04W 72/23* | (2023.01) |
| *H04W 72/54* | (2023.01) |
| *H04W 74/00* | (2009.01) |

(58) Field of Classification Search
 USPC .......................................................... 455/458
 See application file for complete search history.

(56) References Cited

OTHER PUBLICATIONS

[No Author Listed], "3rd Generation Partnership Project; Technical Specification Group Radio Access Network; NR; User Equipment (UE) procedures in Idle mode and RRC Inactive state (Release 15)," 3GPP TS 38.304 V15.3.0, Mar. 2019, 29 pages.

[No Author Listed], "3rd Generation Partnership Project; Technical Specification Group Services and System Aspects; Procedures for the 5G System; Stage 2 (Release 15)," 3GPP TS 23.502 V15.5.0, Mar. 2019, 355 pages.

Intel Corporation, "Motivation for Ran Level Mutli-Sim Support," 3GPP TSG RAN #84, RP-191347, Newport Beach, USA, Jun. 3-9, 2019, 7 pages.

International Preliminary Report on Patentability in International Appln. No. PCT/US2020/034871, dated Dec. 9, 2021, 14 pages.

International Search Report and Written Opinion in International Appln. No. PCT/US2020/034871, dated Sep. 18, 2020, 21 pages.

Qualcomm Incorporated et al., "Avoidance of paging collisions to minimize outage of services," SA WG2 Meeting #122, S2-174243, San Jose Del Cabo, Mexico, Jun. 26-30, 2017, 8 pages.

SA WG2, "New SID: Study on system enablers for multi-SIM devices," TSG SA Meeting #SP-82 SP-181251, Sorrento, Italy, Dec. 12-14, 2018, 6 pages.

SA WG2, "New SID: Study on system enablers for multi-SIM devices," TSG SA Meeting #SP-82, SP-181251, Sorrento, Italy, Dec. 12-14, 2018, 4 pages.

* cited by examiner

AVOIDING PAGING COLLISIONS IN A DEVICE WITH MULTIPLE SUBSCRIPTIONS

CLAIM OF PRIORITY

This is the U.S. National Phase Application under 35 U.S.C. § 371 of International Patent Application No. PCT/US2020/034871 filed May 28, 2020, which claims priority under 35 U.S.C. § 119(e) to U.S. Patent Application Ser. No. 62/853,631, filed on May 28, 2019, the entire contents of which are hereby incorporated by reference.

TECHNICAL FIELD

This disclosure relates generally to wireless communications networks, such as cellular networks. More specifically, this disclosure relates to techniques for avoiding paging collisions with respect to a wireless communications network.

BACKGROUND

Wireless communication systems are rapidly growing in usage. Further, wireless communication technology has evolved from voice-only communications to also include the transmission of data, such as Internet and multimedia content, to a variety of devices.

SUMMARY

In an aspect, a method can be performed by one or more device processors in one or more wireless communications networks. The method includes determining, by a user equipment (UE), a first identifier assigned to the UE for use on a first wireless communications network; determining, by the UE based on the first identifier, one or more first time slots for monitoring the first wireless communication networks for first data directed to the UE; determining, by the UE, a second identifier assigned to the UE for use on a second wireless communications network; determining, by the UE based on the second identifier, one or more second time slots for monitoring the second wireless communication networks for second data directed to the UE; determining, by the UE, that the one or more first time slots at least partially overlap the one or more second time slots; and responsive to determining that the one or more first time slots at least partially overlap the one or more second time slots, transmitting, by the UE to the second wireless communications network, least one of a request for a third identifier to be assigned to the UE for use on the second wireless communications network, wherein the third identifier is different from the second identifier, or a request that the one or more second time slots be offset by an interval of time.

Implementations of this aspect can include one or more of the following features.

In some implementations, the first data can include one or more first paging messages from the first communications network.

In some implementations, the second data can include one or more paging messages from the second communications network.

In some implementations, the first identifier can be associated with a first universal subscriber identity module (USIM) of the UE.

In some implementations, the second identifier can be associated with a second USIM of the UE, where the second USIM is different from the first USIM.

In some implementations, the one or more first time slots can be determined based on a first function having at least a portion of the first identifier as an input.

In some implementations, the one or more second time slots can be determined based on a second function having at least a portion of the second identifier as an input.

In some implementations, determining the second identifier can include transmitting, by the UE, a first message to the second wireless communications network, the first message including a request to register the UE with respect to the second wireless communications network; receiving, by the UE, a second message from the second wireless communications network, the second message including an indication that the request has been accepted, and an indication of the second identifier. In some implementations, the second message can be received from an Access and Mobility Management Function (AMF) of the second wireless communications network.

In some implementations, determining the second identifier can include receiving, by the UE, a message from the second wireless communications network. The message can include an indication of a modification to a registration of the UE with respect to the second wireless communications network, and an indication of the second identifier. In some implementations, the message can be received from an Access and Mobility Management Function (AMF) of the second wireless communications network.

In some implementations, the request for the third identifier can include an indication of at least a portion of the first identifier.

In some implementations, the request that the one or more second time slots be offset by the interval of time can include an indication of the interval of time.

In some implementations, the method can further include receiving, by the UE device, an indication of the third identifier from the second wireless communications network; determining, by the UE based on the third identifier, one or more third time slots for monitoring the second wireless communication networks for the second data directed to the UE; monitoring, by the UE, the first wireless communication networks for the first data directed to the UE during the one or more first time slots; and monitoring, by the UE, the second wireless communication networks for the second data directed to the UE during the one or more third time slots.

In some implementations, the method can further include determining, by the UE based on the third identifier, one or more third time slots for monitoring the second wireless communication networks for the second data directed to the UE. Determining the one or more third time slots can include offsetting the one or more second time by the interval of time. The method can also include monitoring, by the UE, the first wireless communication networks for the first data directed to the UE during the one or more first time slots; and monitoring, by the UE, the second wireless communication networks for the second data directed to the UE during the one or more second time slots.

In some implementations, at least one of the first identifier, the second identifier, or the third identifier can be a Fifth Generation Temporary Mobile Subscriber Identity (5G-TMSI) in accordance with 3rd Generation Partnership Project (3GPP) technical standards.

In some implementations, at least one of the first wireless communications network or the second wireless network can be Fifth Generation (5G) network in accordance with 3rd Generation Partnership Project (3GPP) technical standards.

In some implementations, at least one of the first identifier, the second identifier, or the third identifier can be a Fifth Generation Globally Unique Temporary Identity (5G-GUTI) in accordance with 3GPP technical standards.

In some implementations, the first wireless communications network can be a Fourth Generation (4G) network in accordance with 3rd Generation Partnership Project (3GPP) technical standards, and the second wireless communications network can be a Fifth Generation (5G) network in accordance with 3GPP technical standards, and In some implementations, the first identifier can be an international mobile subscriber identity (IMSI), and the second identifier and the third identifier can be Fifth Generation Globally Unique Temporary Identities (5G-GUTIs) in accordance with 3GPP technical standards.

Other implementations are directed to systems, devices, and non-transitory, computer-readable media having instructions stored thereon, that when executed by one or more processors, cause the one or more processors to perform operations described herein.

The details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
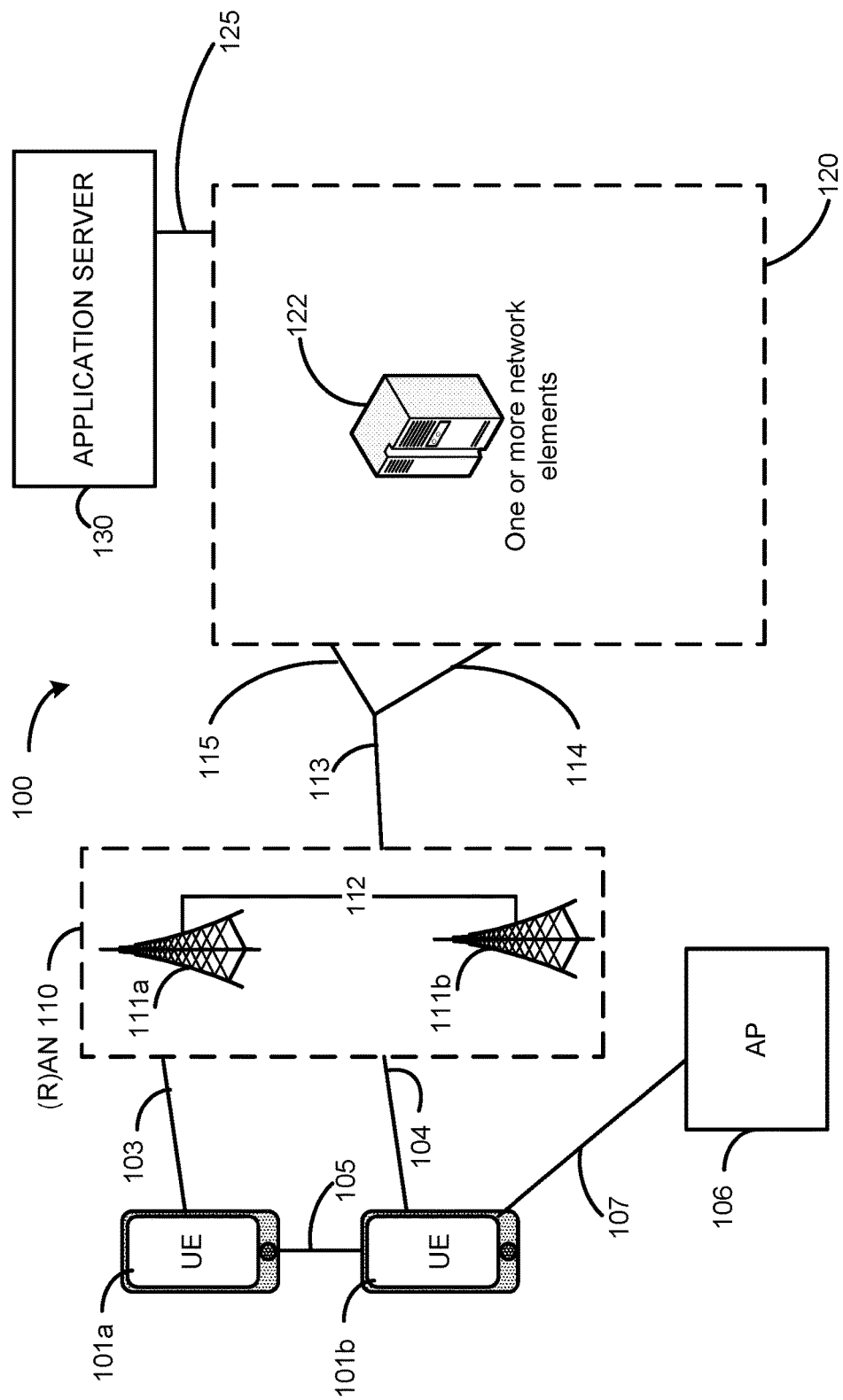
FIG. 1 is a block diagram illustrating an example wireless communication system.

This disclosure describes methods and systems for avoiding paging collisions with respect to a wireless communications network In an example implementation, a wireless communications network can send one or more paging messages to a user equipment (UE) to inform the UE of incoming transmissions to the UE, transmit information regarding changes in the configuration of the wireless communication network, transmit notifications to the UE, and/or to provide any other information to the UE. The UE can periodically monitor the wireless communications network for these paging messages during one or more "paging occasions." Further, in some implementations, paging occasions can be assigned algorithmically based on an identifier associated with the UE. For example, if the UE includes a Universal Subscriber Identity Module (USIM), the paging occasions for the UE can be determined according to a function having an identifier of the USIM as an input, and the paging occasions as an output. The identifier can be, for example, an International Mobile Subscriber Identity (IMSI) (e.g., for an Evolved Packet System (EPS)), or a 5G-Globally Unique Temporary Identifier (5G-GUTI) such as a 5G-S-Temporary Mobile Subscriber Identity (5G-S-TMSI) (e.g., for a Fifth Generation System (5GS)).

If the UE only has a single USIM, the UE is assigned a single set of paging occasions. However, if a UE has multiple USIMs, the UE may be assigned multiple different sets of paging occasions. If the different sets of paging occasions overlap or "collide" in the time domain, the UE may be unable to monitor for paging messages during each of the assigned paging occasions. Thus, the UE may miss paging messages from one or more of the wireless communications networks.

To reduce the likelihood of a collision between sets of paging occasions, the UE can dynamically request that it be assigned a new identifier for use with a wireless communications network, or dynamically request that its assigned paging occasions be offset be a particular amount of time or a particular number of frames. In some implementations, the UE can dynamically make this request as a part of a registration process for a wireless communications network. In some implementations, the UE can dynamically make this request as a part of a registration modification process for the wireless communication network.

The methods and systems described herein can provide specific technical benefits in the field of computers and wireless communications systems. As an example, in at least some implementations, a UE eliminate or otherwise reduce the occurrence of paging collisions when communicating with multiple wireless communication networks. Thus, the UE is less likely to miss paging messages from each wireless communications network, and can communicate with each of the wireless communications networks more reliably.

Further, in some implementations, the methods and systems described herein can be used in conjunction with one or more wireless standards, such as those specified by Third Generation Partnership Project (3GPP) technical specifications.

A system (e.g., the systems described in relation to FIGS. 1-10, below) can be configured to implement one or more of these embodiments either individually or in any combination. These embodiments are subsequently described in greater detail with respect to FIGS. 11-13.

FIG. 1 illustrates an example architecture of a system 100 of a network, in accordance with various embodiments. The following description is provided for an example system 100 that operates in conjunction with the long-term evolution (LTE) system standards and 5th generation (5G) or new radio (NR) system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also include any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an instrument cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, internet of things (IoT) devices, and/or the like.

In some embodiments, any of the UEs 101 may be IoT UEs, which may include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), ProSe or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with a radio access network (RAN) 110. In embodiments, the RAN 110 may be a next-generation RAN or a 5G RAN, an E-UTRAN, or a legacy RAN, such as an evolved universal-terrestrial RAN (UTRAN) or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which includes a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105 and may include one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can include a local wireless connection, such as a connection consistent with any IEEE 802.11 protocol, wherein the AP 106 would include a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can include ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see, e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN 320 of FIG. 3) via an NG interface (discussed infra).

In V2X scenarios one or more of the RAN nodes 111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can include a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also includes individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

The RAN nodes 111 may be configured to communicate with one another via interface 112. In embodiments where the system 100 is an LTE system (e.g., when CN 120 is an EPC 220 as in FIG. 2), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 120 is a 5GC 320 as in FIG. 3), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, core network (CN) 120. The CN 120 may include a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources including a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs. Embodiments where the CN 120 is a 5GC 120 are discussed in more detail with regard to FIG. 3.

In embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
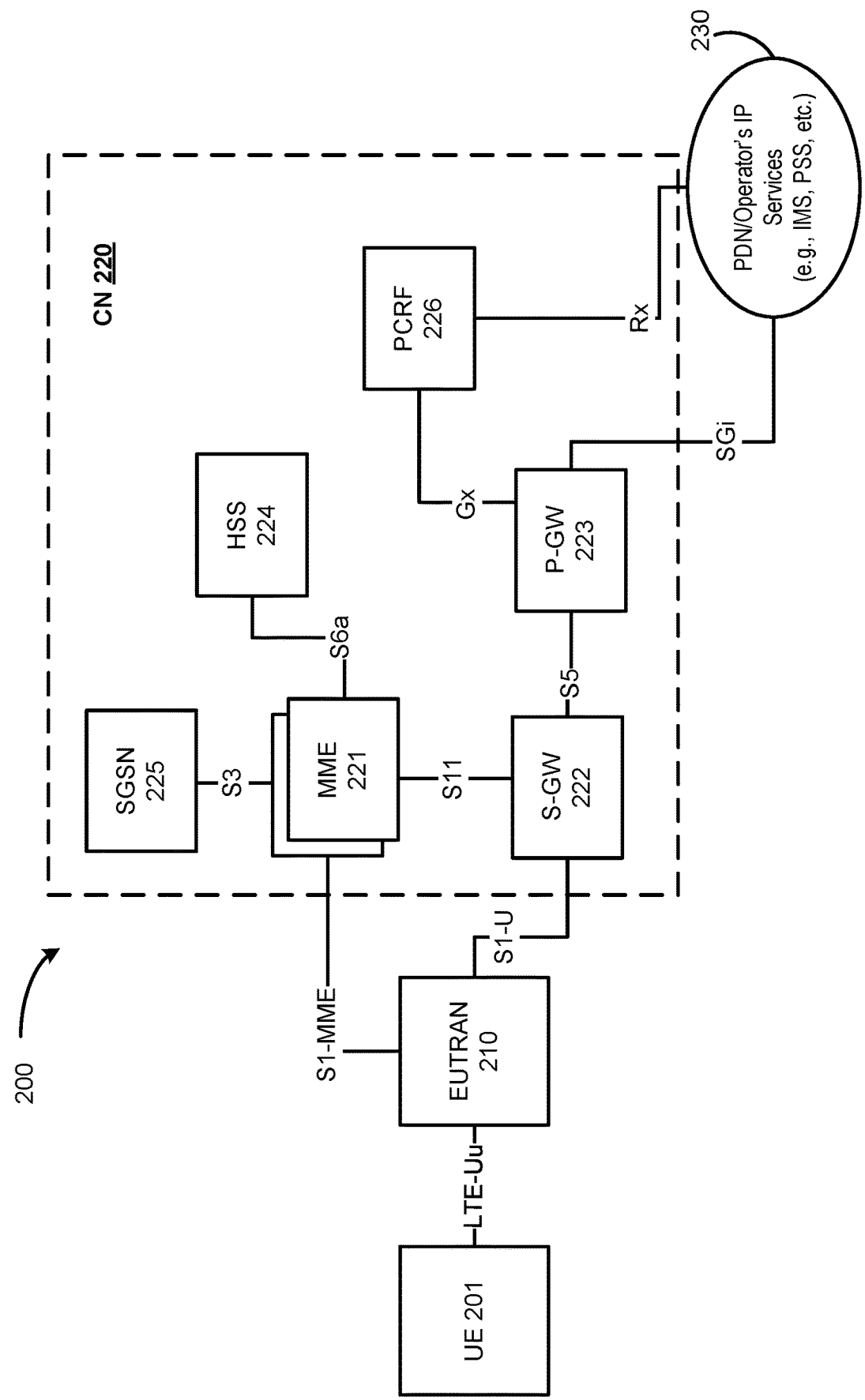
FIGS. 2-3 is a block diagram illustrating an example architecture of a system including a core network.

FIG. 2 illustrates an example architecture of a system 200 including a first CN 220, in accordance with various embodiments. In this example, system 200 may implement the LTE standard wherein the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which may include RAN nodes 111 discussed previously. The CN 220 may include MMEs 221, an S-GW 222, a P-GW 223, a HSS 224, and a SGSN 225.

The MMEs 221 may be similar in function to the control plane of legacy SGSN, and may implement MM functions to keep track of the current location of a UE 201. The MMEs 221 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 201, provide user identity confidentiality, and/or perform other like services to users/subscribers. Each UE 201 and the MME 221 may include an MM or EMM sublayer, and an MM context may be established in the UE 201 and the MME 221 when an attach procedure is successfully completed. The MM context may be a data structure or database object that stores MM-related information of the UE 201. The MMEs 221 may be coupled with the HSS 224 via an S6a reference point, coupled with the SGSN 225 via an S3 reference point, and coupled with the S-GW 222 via an S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network. The S3 reference point between the MMEs 221 and the SGSN 225 may enable user and bearer information exchange for inter-3GPP access network mobility in idle and/or active states.

The HSS 224 may include a database for network users, including subscription-related information to support the network entities' handling of communication sessions. The EPC 220 may include one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc. An S6a reference point between the HSS 224 and the MMEs 221 may enable transfer of subscription and authentication data for authenticating/authorizing user access to the EPC 220 between HSS 224 and the MMEs 221.

The S-GW 222 may terminate the S1 interface 113 ("S1-U" in FIG. 2) toward the RAN 210, and routes data packets between the RAN 210 and the EPC 220. In addition, the S-GW 222 may be a local mobility anchor point for inter-RAN node handovers and also may provide an anchor for inter-3GPP mobility. Other responsibilities may include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 via an S5 reference point.

The P-GW 223 may terminate an SGi interface toward a PDN 230. The P-GW 223 may route data packets between the EPC 220 and external networks such as a network including the application server 130 (alternatively referred to as an "AF") via an IP interface 125 (see e.g., FIG. 1). In embodiments, the P-GW 223 may be communicatively coupled to an application server (application server 130 of FIG. 1 or PDN 230 in FIG. 2) via an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a PCRF 226 via a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate QoS and charging parameters. The PCRF 226 may provision this rule into a PCEF (not shown) with the appropriate TFT and QCI, which commences the QoS and charging as specified by the application server 230. The Gx reference point between the PCRF 226 and the P-GW 223 may allow for the transfer of QoS policy and charging rules from the PCRF 226 to PCEF in the P-GW 223. An Rx reference point may reside between the PDN 230 (or "AF 230") and the PCRF 226.

Figure 3:
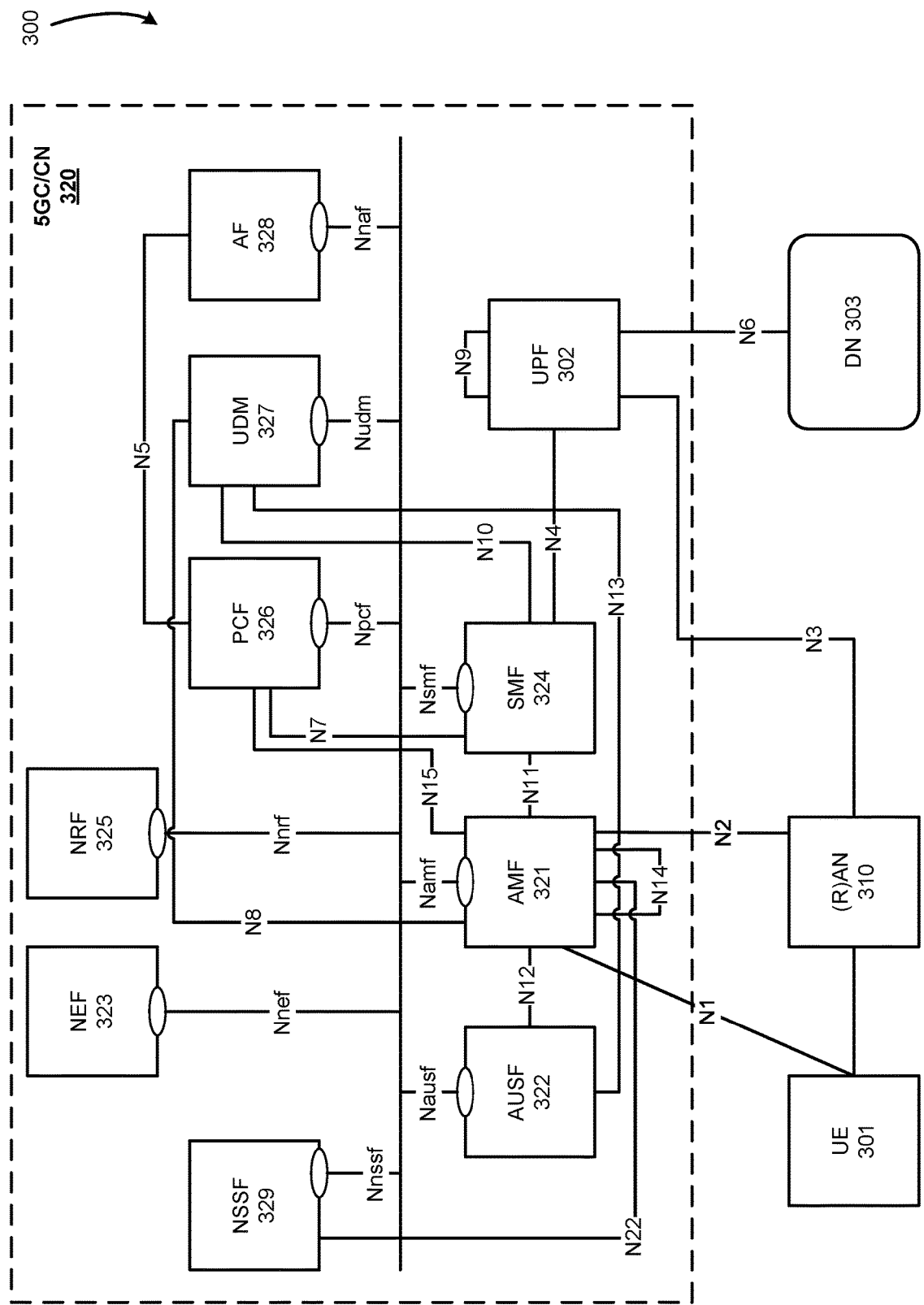

FIG. 3 illustrates an architecture of a system 300 including a second CN 320 in accordance with various embodiments. The system 300 is shown to include a UE 301, which may be the same or similar to the UEs 101 and UE 201 discussed previously; a (R)AN 310, which may be the same or similar to the RAN 110 and RAN 210 discussed previously, and which may include RAN nodes 111 discussed previously; and a DN 303, which may be, for example, operator services, Internet access or 3rd party services; and a 5GC 320. The 5GC 320 may include an AUSF 322; an AMF 321; a SMF 324; a NEF 323; a PCF 326; a NRF 325; a UDM 327; an AF 328; a UPF 302; and a NSSF 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 may include an uplink classifier to support routing traffic flows to a data network. The DN 303 may represent various network operator services, Internet access, or third party services. DN 303 may include, or be similar to, application server 130 discussed previously. The UPF 302 may interact with the SMF 324 via an N4 reference point between the SMF 324 and the UPF 302.

The AUSF 322 may store data for authentication of UE 301 and handle authentication-related functionality. The AUSF 322 may facilitate a common authentication framework for various access types. The AUSF 322 may communicate with the AMF 321 via an N12 reference point between the AMF 321 and the AUSF 322; and may communicate with the UDM 327 via an N13 reference point between the UDM 327 and the AUSF 322. Additionally, the AUSF 322 may exhibit an Nausf service-based interface.

The AMF 321 may be responsible for registration management (e.g., for registering UE 301, etc.), connection management, reachability management, mobility management, and lawful interception of AMF-related events, and access authentication and authorization. The AMF 321 may be a termination point for the an N11 reference point between the AMF 321 and the SMF 324. The AMF 321 may provide transport for SM messages between the UE 301 and the SMF 324, and act as a transparent proxy for routing SM messages. AMF 321 may also provide transport for SMS messages between UE 301 and an SMSF (not shown by FIG. 3). AMF 321 may act as SEAF, which may include interaction with the AUSF 322 and the UE 301, receipt of an intermediate key that was established as a result of the UE 301 authentication process. Where USIM based authentication is used, the AMF 321 may retrieve the security material from the AUSF 322. AMF 321 may also include a SCM function, which receives a key from the SEA that it uses to derive access-network specific keys. Furthermore, AMF 321 may be a termination point of a RAN CP interface, which may include or be an N2 reference point between the (R)AN 310 and the AMF 321; and the AMF 321 may be a termination point of NAS (N1) signalling, and perform NAS ciphering and integrity protection.

AMF 321 may also support NAS signalling with a UE 301 over an Non-3GPP Interworking Function (N3IWF) interface. The N3IWF may be used to provide access to untrusted entities. N3IWF may be a termination point for the N2 interface between the (R)AN 310 and the AMF 321 for the control plane, and may be a termination point for the N3 reference point between the (R)AN 310 and the UPF 302 for the user plane. As such, the AMF 321 may handle N2 signalling from the SMF 324 and the AMF 321 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 301 and AMF 321 via an N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit an Namf service-based interface, and may be a termination point for an N14 reference point between two AMFs 321 and an N17 reference point between the AMF 321 and a 5G-EIR (not shown by FIG. 3).

The UE 301 may need to register with the AMF 321 in order to receive network services. RM is used to register or deregister the UE 301 with the network (e.g., AMF 321), and establish a UE context in the network (e.g., AMF 321). The UE 301 may operate in an RM-REGISTERED state or an RM-DEREGISTERED state. In the RM-DEREGISTERED state, the UE 301 is not registered with the network, and the UE context in AMF 321 holds no valid location or routing information for the UE 301 so the UE 301 is not reachable by the AMF 321. In the RM-REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to renegotiate protocol parameters with the network, among others.

The AMF 321 may store one or more RM contexts for the UE 301, where each RM context is associated with a specific access to the network. The RM context may be a data structure, database object, etc. that indicates or stores, inter alia, a registration state per access type and the periodic update timer. The AMF 321 may also store a 5GC MM context that may be the same or similar to the (E)MM context discussed previously. In various embodiments, the AMF 321 may store a CE mode B Restriction parameter of the UE 301 in an associated MM context or RM context. The AMF 321 may also derive the value, when needed, from the UE's usage setting parameter already stored in the UE context (and/or MM/RM context).

CM may be used to establish and release a signaling connection between the UE 301 and the AMF 321 over the N1 interface. The signaling connection is used to enable NAS signaling exchange between the UE 301 and the CN 320, and includes both the signaling connection between the UE and the AN (e.g., RRC connection or UE-N3IWF connection for non-3GPP access) and the N2 connection for the UE 301 between the AN (e.g., RAN 310) and the AMF 321. The UE 301 may operate in one of two CM states, CM-IDLE mode or CM-CONNECTED mode. When the UE 301 is operating in the CM-IDLE state/mode, the UE 301 may have no NAS signaling connection established with the AMF 321 over the N1 interface, and there may be (R)AN 310 signaling connection (e.g., N2 and/or N3 connections) for the UE 301. When the UE 301 is operating in the CM-CONNECTED state/mode, the UE 301 may have an established NAS signaling connection with the AMF 321 over the N1 interface, and there may be a (R)AN 310 signaling connection (e.g., N2 and/or N3 connections) for the UE 301. Establishment of an N2 connection between the (R)AN 310 and the AMF 321 may cause the UE 301 to transition from CM-IDLE mode to CM-CONNECTED mode, and the UE 301 may transition from the CM-CONNECTED mode to the CM-IDLE mode when N2 signaling between the (R)AN 310 and the AMF 321 is released.

The SMF 324 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301.

The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, etc. In such embodiments, the NEF 323 may authenticate, authorize, and/or throttle the AFs. NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, and/or used for other purposes such as analytics. Additionally, the NEF 323 may exhibit an Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behaviour. The PCF 326 may also implement an FE to access subscription information relevant for policy decisions in a UDR of the UDM 327. The PCF 326 may communicate with the AMF 321 via an N15 reference point between the PCF 326 and the AMF 321, which may include a PCF 326 in a visited network and the AMF 321 in case of roaming scenarios. The PCF 326 may communicate with the AF 328 via an N5 reference point between the PCF 326 and the AF 328; and with the SMF 324 via an N7 reference point between the PCF 326 and the SMF 324. The system 300 and/or CN 320 may also include an N24 reference point between the PCF 326 (in the home network) and a PCF 326 in a visited network. Additionally, the PCF 326 may exhibit an Npcf service-based interface.

The UDM 327 may handle subscription-related information to support the network entities' handling of communication sessions, and may store subscription data of UE 301. For example, subscription data may be communicated between the UDM 327 and the AMF 321 via an N8 reference point between the UDM 327 and the AMF. The UDM 327 may include two parts, an application FE and a UDR (the FE and UDR are not shown by FIG. 3). The UDR may store subscription data and policy data for the UDM 327 and the PCF 326, and/or structured data for exposure and application data (including PFDs for application detection, application request information for multiple UEs 301) for the NEF 323. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 324 via an N10 reference point between the UDM 327 and the SMF 324. UDM 327 may also support SMS management, wherein an SMS-FE implements the similar application logic as discussed previously. Additionally, the UDM 327 may exhibit the Nudm service-based interface.

The AF 328 may provide application influence on traffic routing, provide access to the NCE, and interact with the policy framework for policy control. The NCE may be a mechanism that allows the 5GC 320 and AF 328 to provide information to each other via NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 via the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit an Naf service-based interface.

The NSSF 329 may select a set of network slice instances serving the UE 301. The NSSF 329 may also determine allowed NSSAI and the mapping to the subscribed S-NSSAIs, if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 via an N22 reference point between AMF 321 and NSSF 329; and may communicate with another NSSF 329 in a visited network via an N31 reference point (not shown by FIG. 3). Additionally, the NSSF 329 may exhibit an Nnssf service-based interface.

As discussed previously, the CN 320 may include an SMSF, which may be responsible for SMS subscription checking and verification, and relaying SM messages to/from the UE 301 to/from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

The CN 120 may also include other elements that are not shown by FIG. 3, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 3). Individual NFs may share a UDSF for storing their respective unstructured data or individual NFs may each have their own UDSF located at or near the individual NFs. Additionally, the UDSF may exhibit a Nudsf service-based interface (not shown by FIG. 3). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 3 for clarity. In one example, the CN 320 may include an Nx interface, which is an inter-CN interface between the MME (e.g., MME 221) and the AMF 321 in order to enable interworking between CN 320 and CN 220. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 4:
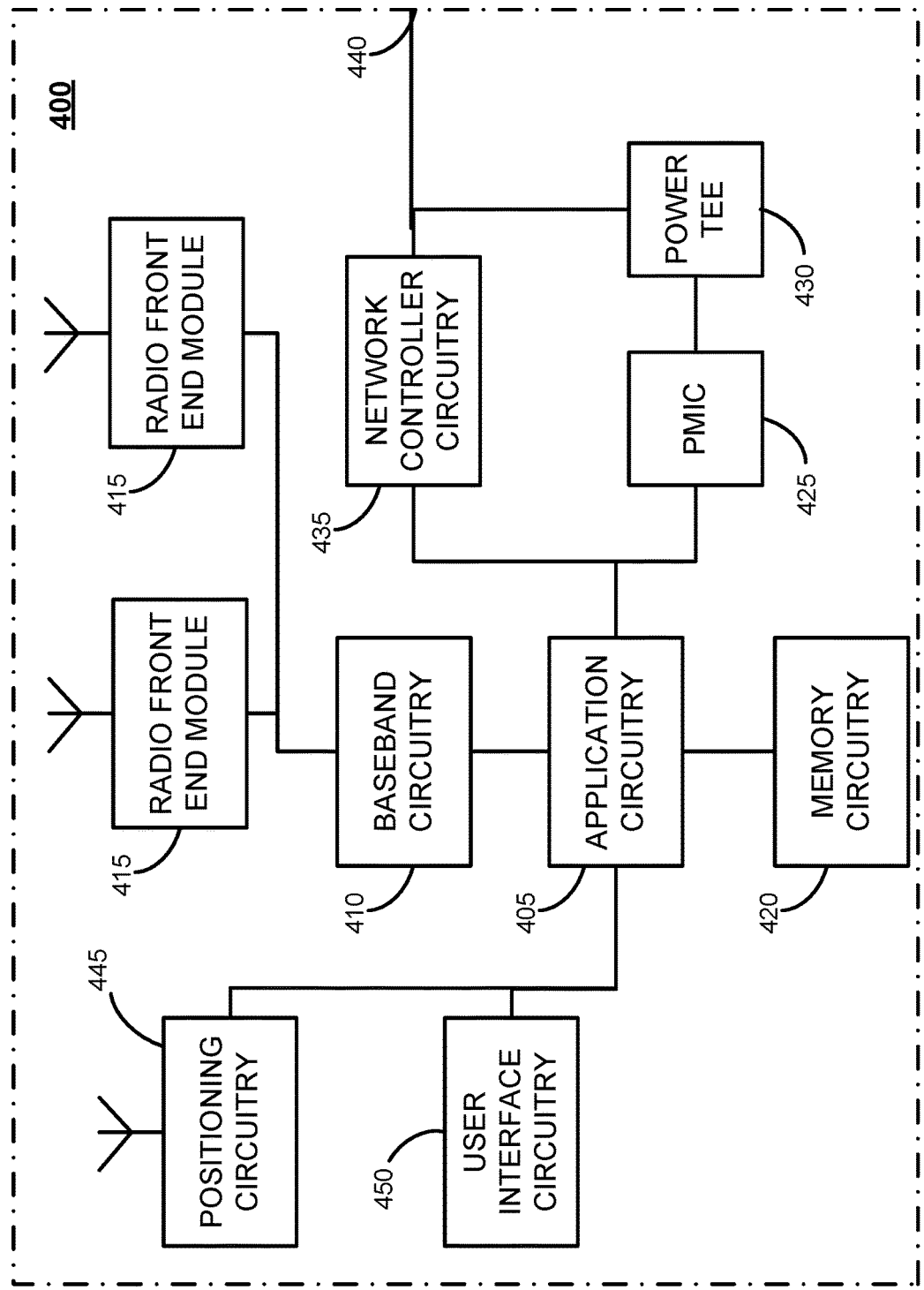
FIG. 4 a block diagram illustrating an example of infrastructure equipment that can be included in a base station, user equipment, or both.

FIG. 4 illustrates an example of infrastructure equipment 400 in accordance with various embodiments. The infrastructure equipment 400 (or "system 400") may be implemented as a base station, radio head, RAN node such as the RAN nodes 111 and/or AP 106 shown and described previously, application server(s) 130, and/or any other element/device discussed herein. In other examples, the system 400 could be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface 450. In some embodiments, the device 400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 405 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory/storage elements and may be configured to execute instructions stored in the memory/storage to enable various applications or operating systems to run on the system 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 405 may include, or may be, a special-purpose processor/controller to operate according to the various embodiments herein. As examples, the processor(s) of application circuitry 405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 400 may not utilize application circuitry 405, and instead may include a special-purpose processor/controller to process IP data received from an EPC or 5GC, for example.

In some implementations, the application circuitry 405 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 405 may include logic blocks or logic fabric, and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed infra with regard to FIG. 6.

User interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 415 may include a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 611 of FIG. 6 infra), and the RFEM may be connected to multiple antennas. In alternative implementations, both mmWave and sub-mmWave radio functions may be implemented in the same physical RFEM 415, which incorporates both mmWave antennas and sub-mmWave.

The memory circuitry 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 420 may be implemented as one or more of solder down packaged integrated circuits, socketed memory modules and plug-in memory cards.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 440 using a physical connection, which may be electrical (commonly referred to as a "copper interconnect"), optical, or wireless. The network controller circuitry 435 may include one or more dedicated processors and/or FPGAs to communicate using one or more of the aforementioned protocols. In some implementations, the network controller circuitry 435 may include multiple controllers to provide connectivity to other networks using the same or different protocols.

The positioning circuitry 445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 includes various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 445 may include a Micro-Technology for Positioning, Navigation, and Timing (Micro-PNT) IC that uses a master timing clock to perform position tracking/estimation without GNSS assistance. The positioning circuitry 445 may also be part of, or interact with, the baseband circuitry 410 and/or RFEMs 415 to communicate with the nodes and components of the positioning network. The positioning circuitry 445 may also provide position data and/or time data to the application circuitry 405, which may use the data to synchronize operations with various infrastructure (e.g., RAN nodes 111, etc.), or the like.

The components shown by FIG. 4 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 5:
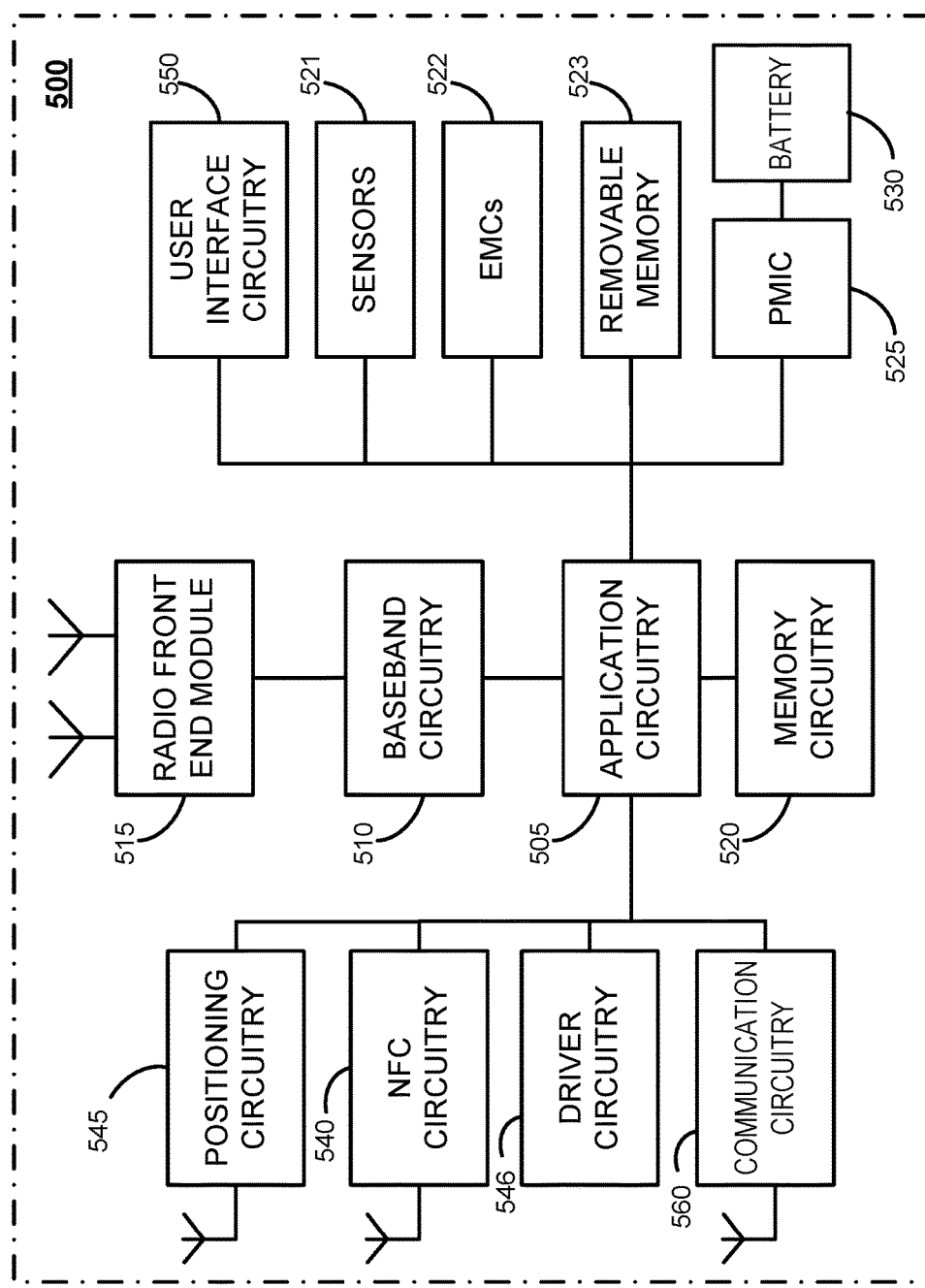
FIG. 5 is a block diagram illustrating an example computer platform that can be included in user equipment, an application server, or both.

FIG. 5 illustrates an example of a platform 500 (or "device 500") in accordance with various embodiments. In embodiments, the computer platform 500 may be suitable for use as UEs 101, 201, 301, application servers 130, and/or any other element/device discussed in this document. The platform 500 may include any combinations of the components shown in the example. The components of platform 500 may be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The block diagram of FIG. 5 is intended to show a high level view of components of the computer platform 500. However, some of the components shown may be omitted, additional components may be present, and different arrangement of the components shown may occur in other implementations.

Application circuitry 505 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory/storage to enable various applications or operating systems to run on the system 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed in this document.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 405 may include, or may be, a special-purpose processor/controller to operate according to the various embodiments in this document.

As examples, the processor(s) of application circuitry 505 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 505 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 505 may be a part of a system on a chip (SoC) in which the application circuitry 505 and other components are formed into a single integrated circuit, or a single package, such as the Edison™ or Galileo™ SoC boards from Intel® Corporation.

Additionally or alternatively, application circuitry 505 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 505 may include logic blocks or logic fabric, and other interconnected resources that may be programmed to perform various functions, such as the procedures, methods, functions, etc. of the various embodiments discussed in this document. In such embodiments, the circuitry of application circuitry 505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed infra with regard to FIG. 6.

The RFEMs 515 may include a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 611 of FIG. 6 infra), and the RFEM may be connected to multiple antennas. In alternative implementations, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 500 may incorporate the three-dimensional (3D) cross-point (XPOINT) memories from Intel® and Micron®.

Removable memory circuitry 523 may include devices, circuitry, enclosures/housings, ports or receptacles, etc. used to couple portable data storage devices with the platform 500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 500 may also include interface circuitry (not shown) that is used to connect external devices with the platform 500. The external devices connected to the platform 500 via the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (sensor data) about the detected events to some other a device, module, subsystem, etc. Examples of such sensors include, inter alia, inertia measurement units (IMUs) including accelerometers, gyroscopes, and/or magnetometers; microelectromechanical systems (MEMS) or nanoelectromechanical systems (NEMS) including 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 522 include devices, modules, or subsystems whose purpose is to enable platform 500 to change its state, position, and/or orientation, or move or control a mechanism or (sub)system. Additionally, EMCs 522 may be configured to generate and send messages/signaling to other components of the platform 500 to indicate a current state of the EMCs 522. Examples of the EMCs 522 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 500 is configured to operate one or more EMCs 522 based on one or more captured events and/or instructions or control signals received from a service provider and/or various clients.

In some implementations, the interface circuitry may connect the platform 500 with positioning circuitry 545. The positioning circuitry 545 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 545 includes various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 545 may include a Micro-PNT IC that uses a master timing clock to perform position tracking/estimation without GNSS assistance. The positioning circuitry 545 may also be part of, or interact with, the baseband circuitry 410 and/or RFEMs 515 to communicate with the nodes and components of the positioning network. The positioning circuitry 545 may also provide position data and/or time data to the application circuitry 505, which may use the data to synchronize operations with various infrastructure (e.g., radio base stations), for turn-by-turn navigation applications, or the like In some implementations, the interface circuitry may connect the platform 500 with Near-Field Communication (NFC) circuitry 540. NFC circuitry 540 is configured to provide contactless, short-range communications based on radio frequency identification (RFID) standards, wherein magnetic field induction is used to enable communication between NFC circuitry 540 and NFC-enabled devices external to the platform 500 (e.g., an "NFC touchpoint"). NFC circuitry 540 includes an NFC controller coupled with an antenna element and a processor coupled with the NFC controller. The NFC controller may be a chip/IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

In some implementations, the interface circuitry may connect the platform 500 with communications circuitry 560. Though communications circuitry 560 is shown as separate from the RFEM 515, these modules can form a single, combined module. The communication circuitry 560 is configured to enable the platform 500 to communicate on the cellular network, as subsequently described in relation to FIG. 7.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 and/or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may often be included when the platform 500 is capable of being powered by a battery 530, for example, when the device is included in a UE 101, 201, 301.

In some embodiments, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback, handover, etc. The platform 500 goes into a very low power state and it performs paging where again it periodically wakes up to listen to the network and then powers down again. The platform 500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 530 may power the platform 500, although in some examples the platform 500 may be mounted deployed in a fixed location, and may have a power supply coupled to an electrical grid. The battery 530 may be a lithium ion battery, a metal-air battery, such as a zinc-air battery, an aluminum-air battery, a lithium-air battery, and the like. In some implementations, such as in V2X applications, the battery 530 may be a typical lead-acid automotive battery.

In some implementations, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, sensing frequency, and the like.

A power block, or other power supply coupled to an electrical grid may be coupled with the BMS to charge the battery 530. In some examples, the power block XS30 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 550 includes various input/output (I/O) devices present within, or connected to, the platform 500, and includes one or more user interfaces designed to enable user interaction with the platform 500 and/or peripheral component interfaces designed to enable peripheral component interaction with the platform 500. The user interface circuitry 550 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 500. The output device circuitry may also include speakers or other audio emitting devices, printer(s), and/or the like. In some embodiments, the sensor circuitry 521 may be used as the input device circuitry (e.g., an image capture device, motion capture device, or the like) and one or more EMCs may be used as the output device circuitry (e.g., an actuator to provide haptic feedback or the like). In another example, NFC circuitry including an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 500 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 6:
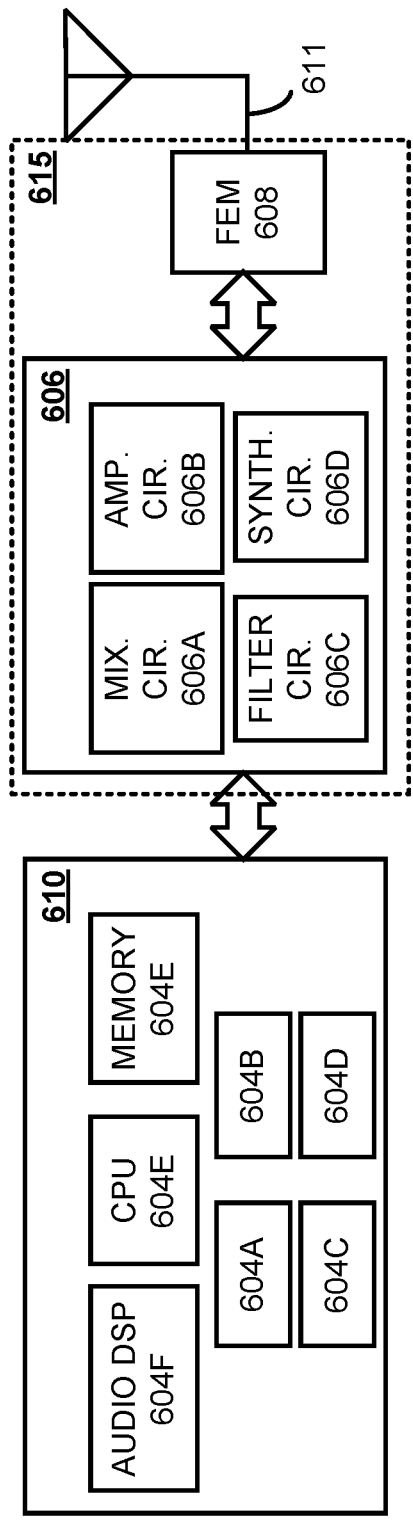
FIG. 6 is a block diagram illustrating example baseband circuitry and radio front end module circuitry.

FIG. 6 illustrates example components of baseband circuitry 610 and radio front end modules (RFEM) 615 in accordance with various embodiments. The baseband circuitry 610 corresponds to the baseband circuitry 410 and 510 of FIGS. 4 and 5, respectively. The RFEM 615 corresponds to the RFEM 415 and 515 of FIGS. 4 and 5, respectively. As shown, the RFEMs 615 may include Radio Frequency (RF) circuitry 606, front-end module (FEM) circuitry 608, antenna array 611 coupled together at least as shown.

The baseband circuitry 610 includes circuitry and/or control logic configured to carry out various radio/network protocol and radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 610 may include Fast-Fourier Transform (FFT), precoding, or constellation mapping/demapping functionality. In some embodiments, encoding/decoding circuitry of the baseband circuitry 610 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry 405/505 (see FIGS. 4 and 5) for generation and processing of the baseband signals and for controlling operations of the RF circuitry 606. The baseband circuitry 610 may handle various radio control functions.

The aforementioned circuitry and/or control logic of the baseband circuitry 610 may include one or more single or multi-core processors. For example, the one or more processors may include a 3G baseband processor 604A, a 4G/LTE baseband processor 604B, a 5G/NR baseband processor 604C, or some other baseband processor(s) 604D for other existing generations, generations in development or to be developed in the future (e.g., sixth generation (6G), etc.). In other embodiments, some or all of the functionality of baseband processors 604A-D may be included in modules stored in the memory 604G and executed via a Central Processing Unit (CPU) 604E. In other embodiments, some or all of the functionality of baseband processors 604A-D may be provided as hardware accelerators (e.g., FPGAs, ASICs, etc.) loaded with the appropriate bit streams or logic blocks stored in respective memory cells. In various embodiments, the memory 604G may store program code of a real-time OS (RTOS), which when executed by the CPU 604E (or other baseband processor), is to cause the CPU 604E (or other baseband processor) to manage resources of the baseband circuitry 610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed in this document. In addition, the baseband circuitry 610 includes one or more audio digital signal processor(s) (DSP) 604F. The audio DSP(s) 604F include elements for compression/decompression and echo cancellation and may include other suitable processing elements in other embodiments.

In some embodiments, each of the processors 604A-604E include respective memory interfaces to send/receive data to/from the memory 604G. The baseband circuitry 610 may further include one or more interfaces to communicatively couple to other circuitries/devices, such as an interface to send/receive data to/from memory external to the baseband circuitry 610; an application circuitry interface to send/receive data to/from the application circuitry 405/505 of FIGS. 4-XT); an RF circuitry interface to send/receive data to/from RF circuitry 606 of FIG. 6; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 525.

In alternate embodiments (which may be combined with the above described embodiments), baseband circuitry 610 includes one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed in this document. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (e.g., the radio front end modules 615).

Although not shown by FIG. 6, in some embodiments, the baseband circuitry 610 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 610 and/or RF circuitry 606 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 610 and/or RF circuitry 606 are part of a Wi-Fi communication system. In the second example, the protocol processing circuitry would operate Wi-Fi MAC and logical link control (LLC) functions. The protocol processing circuitry may include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed in this document may be implemented, for example, as a solder-down substrate including one or more integrated circuits (ICs), a single packaged IC soldered to a main circuit board or a multi-chip module containing two or more ICs. In one example, the components of the baseband circuitry 610 may be suitably combined in a single chip or chipset, or disposed on a same circuit board. In another example, some or all of the constituent components of the baseband circuitry 610 and RF circuitry 606 may be implemented together such as, for example, a system on a chip (SoC) or System-in-Package (SiP). In another example, some or all of the constituent components of the baseband circuitry 610 may be implemented as a separate SoC that is communicatively coupled with and RF circuitry 606 (or multiple instances of RF circuitry 606). In yet another example, some or all of the constituent components of the baseband circuitry 610 and the application circuitry 405/505 may be implemented together as individual SoCs mounted to a same circuit board (e.g., a "multi-chip package").

In some embodiments, the baseband circuitry 610 may provide for communication compatible with one or more radio technologies. For example, in some embodiments, the baseband circuitry 610 may support communication with an E-UTRAN or other WMAN, a WLAN, a WPAN. Embodiments in which the baseband circuitry 610 is configured to support radio communications of more than one wireless protocol may be referred to as multi-mode baseband circuitry.

RF circuitry 606 enables communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path, which may include circuitry to down-convert RF signals received from the FEM circuitry 608 and provide baseband signals to the baseband circuitry 610. RF circuitry 606 may also include a transmit signal path, which may include circuitry to up-convert baseband signals provided by the baseband circuitry 610 and provide RF output signals to the FEM circuitry 608 for transmission.

In some embodiments, the receive signal path of the RF circuitry 606 includes mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some embodiments, the output baseband signals may be zero-frequency baseband signals, although this is not a requirement. In some embodiments, mixer circuitry 606a of the receive signal path may include passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 610 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer including a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 610 or the application circuitry 405/505 depending on the desired output frequency. In some embodiments, a divider control input (e.g., N) may be determined from a look-up table based on a channel indicated by the application circuitry 405/505.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from antenna array 611, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of antenna elements of antenna array 611. In various embodiments, the amplification through the transmit or receive signal paths may be done solely in the RF circuitry 606, solely in the FEM circuitry 608, or in both the RF circuitry 606 and the FEM circuitry 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission by one or more antenna elements of the antenna array 611.

The antenna array 611 includes one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted via the antenna elements of the antenna array 611 including one or more antenna elements (not shown). The antenna elements may be omnidirectional, direction, or a combination thereof. The antenna elements may be formed in a multitude of arranges as are known and/or discussed in this document. The antenna array 611 may include microstrip antennas or printed antennas that are fabricated on the surface of one or more printed circuit boards. The antenna array 611 may be formed in as a patch of metal foil (e.g., a patch antenna) in a variety of shapes, and may be coupled with the RF circuitry 606 and/or FEM circuitry 608 using metal transmission lines or the like.

Processors of the application circuitry 405/505 and processors of the baseband circuitry 610 may be used to execute elements of one or more instances of a protocol stack. For example, processors of the baseband circuitry 610, alone or in combination, may be used execute Layer 3, Layer 2, or Layer 1 functionality, while processors of the application circuitry 405/505 may utilize data (e.g., packet data) received from these layers and further execute Layer 4 functionality (e.g., TCP and UDP layers). As referred to in this document, Layer 3 may include a RRC layer, described in further detail below. As referred to in this document, Layer 2 may include a MAC layer, an RLC layer, and a PDCP layer, described in further detail below. As referred to in this document, Layer 1 may include a PHY layer of a UE/RAN node, described in further detail below.

Figure 7:
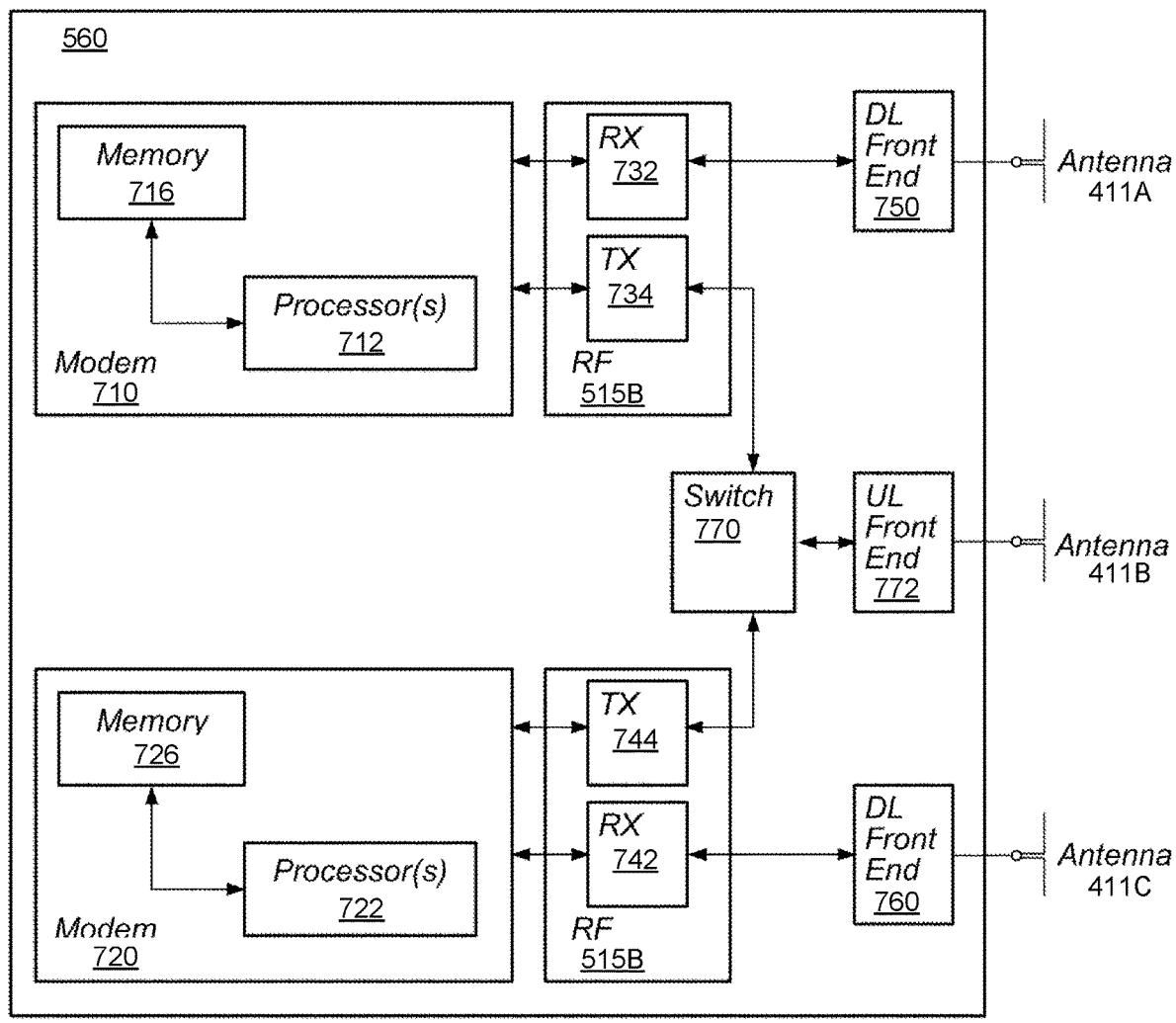
FIG. 7 is a block diagram illustrating example cellular communication circuitry.

FIG. 7 illustrates an example block diagram of cellular communication circuitry 560. It is noted that the block diagram of the cellular communication circuitry 560 of FIG. 7 is an example of a cellular communication circuit, but that other configurations are also possible. In some implementations, the cellular communication circuitry 560 may be included in a communication device, such as the platform 500 described above. As noted above, platform 500 may be a UE device, a mobile device or mobile station, a wireless device or wireless station, a desktop computer or computing device, a mobile computing device (e.g., a laptop, notebook, or portable computing device), a tablet, a wireless sensor, surveillance equipment, or wearables devices, or a combination of them, among other devices.

The cellular communication circuitry 560 may couple (e.g., communicatively, directly, or indirectly) to one or more antennas, such as antennas of antenna array 611 as shown (e.g., in FIG. 6). In some implementations, the cellular communication circuitry 560 includes or is communicatively coupled to dedicated receive chains, processors, or radios for multiple RATs (e.g., a first receive chain for LTE and a second receive chain for 5G NR). For example, as shown in FIG. 7, cellular communication circuitry 560 may include a modem 710 and a modem 720. Modem 710 may be configured for communications according to a first RAT, e.g., such as LTE or LTE-A, and modem 720 may be configured for communications according to a second RAT, e.g., such as 5G NR.

The modem 710 includes one or more processors 712 and a memory 716 in communication with the processors 712. The modem 710 is in communication with a radio frequency front end module 515*a* (e.g., RFEM 515). The RFEM 515*a* may include circuitry for transmitting and receiving radio signals. For example, the RF front end 730 includes receive circuitry (RX) 732 and transmit circuitry (TX) 734. In some implementations, the receive circuitry 732 is in communication with downlink (DL) front end 750, which may include circuitry for receiving radio signals via antenna 611*a*.

Similarly, the modem 720 includes one or more processors 722 and a memory 726 in communication with the processors 722. The modem 720 is in communication with an RFEM 515*b*. The RFEM 515*b* may include circuitry for transmitting and receiving radio signals. For example, the RF front end 740 may include receive circuitry 742 and transmit circuitry 744. In some implementations, the receive circuitry 742 is in communication with DL front end 760, which may include circuitry for receiving radio signals via antenna 611*b*.

The modem 710 may include hardware and software components for implementing the above features or for time division multiplexing UL data for NSA NR operations, as well as the various other techniques described in this document. The processors 712 may be configured to implement part or all of the features described in this document, e.g., by executing program instructions stored on a memory medium (e.g., a non-transitory computer-readable memory medium). Alternatively (or in addition), the processor 712 may be configured as a programmable hardware element, such as an FPGA (Field Programmable Gate Array), or as an ASIC (Application Specific Integrated Circuit). Alternatively (or in addition) the processor 712, in conjunction with one or more of the other components 730, 732, 734, 750, 770, 772, and 611 may be configured to implement some or all of the features described in this document.

The processors 712 may include one or more processing elements. Thus, processors 712 may include one or more integrated circuits (ICs) that are configured to perform the functions of processors 712. In addition, each integrated circuit may include circuitry (e.g., first circuitry, second circuitry, etc.) configured to perform the functions of processors 712.

The modem 720 may include hardware and software components for implementing the above features for time division multiplexing UL data for NSA NR operations, as well as the various other techniques described in this document. The processors 722 may be configured to implement part or all of the features described in this document, e.g., by executing program instructions stored on a memory medium (e.g., a non-transitory computer-readable memory medium). Alternatively (or in addition), processor 722 may be configured as a programmable hardware element, such as an FPGA (Field Programmable Gate Array), or as an ASIC (Application Specific Integrated Circuit). Alternatively (or in addition) the processor 722, in conjunction with one or more of the other components 740, 742, 744, 750, 770, 772, and 611 may be configured to implement part or all of the features described in this document.

In addition, the processors 722 may include one or more processing elements. Thus, the processors 722 may include one or more integrated circuits (ICs) that are configured to perform the functions of processors 722. In addition, each integrated circuit may include circuitry (e.g., first circuitry, second circuitry, etc.) configured to perform the functions of processors 722.

Figure 8:
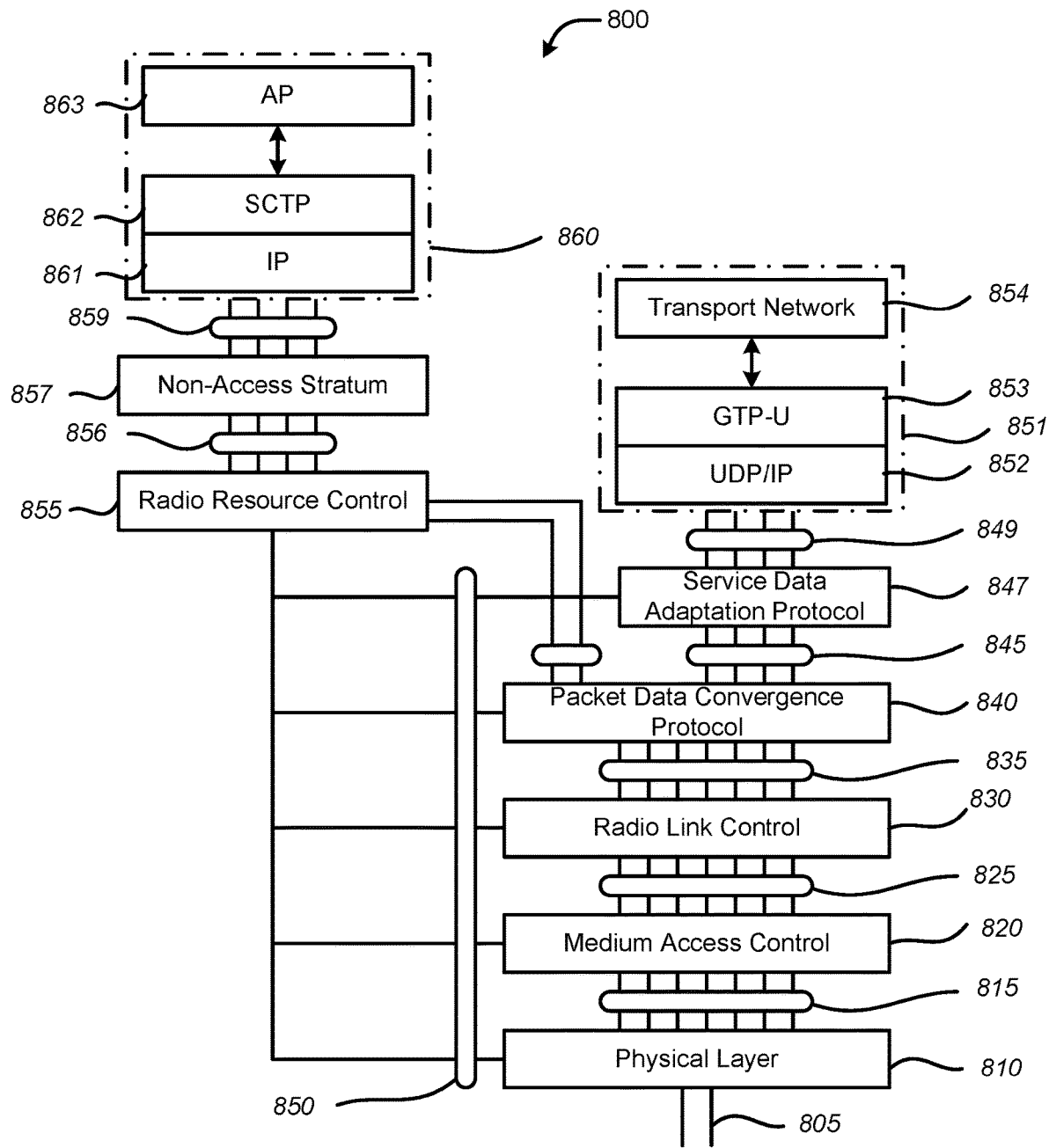
FIG. 8 is a block diagram illustrating example protocol functions for implementing in a wireless communication device.

FIG. 8 is a block diagram illustrating example protocol functions for implementing in a wireless communication device according to various embodiments. In particular, FIG. 8 includes an arrangement 800 showing interconnections between various protocol layers/entities. The following description of FIG. 8 is provided for various protocol layers/entities that operate in conjunction with the 5G/NR system standards and LTE system standards, but some or all of the aspects of FIG. 8 may be applicable to other wireless communication network systems as well.

The protocol layers of arrangement 800 may include one or more of PHY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 may include one or more physical channels, such as those discussed in this document. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 810 may process requests from and provide indications to an instance of MAC 820 via one or more PHY-SAP 815. According to some embodiments, requests and indications communicated via PHY-SAP 815 may include one or more transport channels.

Instance(s) of MAC 820 may process requests from, and provide indications to, an instance of RLC 830 via one or more MAC-SAPs 825. These requests and indications communicated via the MAC-SAP 825 may include one or more logical channels. The MAC 820 may perform mapping between the logical channels and transport channels, multiplexing of MAC SDUs from one or more logical channels onto TBs to be delivered to PHY 810 via the transport channels, de-multiplexing MAC SDUs to one or more logical channels from TBs delivered from the PHY 810 via transport channels, multiplexing MAC SDUs onto TBs, scheduling information reporting, error correction through HARQ, and logical channel prioritization.

Instance(s) of RLC 830 may process requests from and provide indications to an instance of PDCP 840 via one or more radio link control service access points (RLC-SAP) 835. These requests and indications communicated via RLC-SAP 835 may include one or more RLC channels. The RLC 830 may operate in a plurality of modes of operation, including: Transparent Mode (TM), Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 and/or instance(s) of SDAP 847 via one or more packet data convergence protocol service access points (PDCP-SAP) 845. These requests and indications communicated via PDCP-SAP 845 may include one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 847 may process requests from and provide indications to one or more higher layer protocol entities via one or more SDAP-SAP 849. These requests and indications communicated via SDAP-SAP 849 may include one or more QoS flows. The SDAP 847 may map QoS flows to DRBs, and vice versa, and may also mark QFIs in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In embodiments, the SDAP 847 may only be used in NR implementations and may not be used in LTE implementations.

The RRC 855 may configure, via one or more management service access points (M-SAP), aspects of one or more protocol layers, which may include one or more instances of PHY 810, MAC 820, RLC 830, PDCP 840 and SDAP 847. In embodiments, an instance of RRC 855 may process requests from and provide indications to one or more NAS entities 857 via one or more RRC-SAPs 856. The main services and functions of the RRC 855 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may include one or more IEs, which may each include individual data fields or data structures.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

According to various embodiments, one or more protocol entities of arrangement 800 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In such embodiments, one or more protocol entities that may be implemented in one or more of UE 101, gNB 111, AMF 321, etc. may communicate with a respective peer protocol entity that may be implemented in or on another device using the services of respective lower layer protocol entities to perform such communication. In some embodiments, a gNB-CU of the gNB 111 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In a first example, a control plane protocol stack may include, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863.

In NR implementations, the AP 863 may be an NG application protocol layer (NGAP or NG-AP) 863 for the NG interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NG interface 113 and may include Elementary Procedures (EPs). An NG-AP EP may be a unit of interaction between the NG-RAN node 111 and the AMF 321. The NG-AP 863 services may include two groups: UE-associated services (e.g., services related to a UE 101) and non-UE-associated services (e.g., services related to the whole NG interface instance between the NG-RAN node 111 and AMF 321). These services may include functions including, but not limited to: a paging function for the sending of paging requests to NG-RAN nodes 111 involved in a particular paging area; a UE context management function for allowing the AMF 321 to establish, modify, and/or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 863 may support the functions of the Xn interface 112 and may include XnAP basic mobility procedures and XnAP global procedures. The XnAP basic mobility procedures may include procedures used to handle UE mobility within the NG RAN 111 (or E-UTRAN 210), such as handover preparation and cancellation procedures, SN Status Transfer procedures, UE context retrieval and UE context release procedures, RAN paging procedures, dual connectivity related procedures, and the like. The XnAP global procedures may include procedures that are not related to a specific UE 101, such as Xn interface setup and reset procedures, NG-RAN update procedures, cell activation procedures, and the like.

In LTE implementations, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111.

The S1 Application Protocol layer (S1-AP) 863 may support the functions of the S1 interface, and similar to the NG-AP discussed previously, the S1-AP may include S1-AP EPs. An S1-AP EP may be a unit of interaction between the E-UTRAN node 111 and an MME 221 within an LTE CN 120. The S1-AP 863 services may include two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and may include X2AP basic mobility procedures and X2AP global procedures. The X2AP basic mobility procedures may include procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may include procedures that are not related to a specific UE 101, such as X2 interface setup and reset procedures, load indication procedures, error indication procedures, cell activation procedures, and the like.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 111 and the AMF 321/MME 221 based, in part, on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 111 may include L2 and L1 layer communication links (e.g., wired or wireless) with the MME/AMF to exchange information.

In a second example, a user plane protocol stack may include, in order from highest layer to lowest layer, SDAP 847, PDCP 840, RLC 830, MAC 820, and PHY 810. The user plane protocol stack may be used for communication between the UE 101, the RAN node 111, and UPF 302 in NR implementations or an S-GW 222 and P-GW 223 in LTE implementations. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (including a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data via a protocol stack including an L1 layer (e.g., PHY 810), an L2 layer (e.g., MAC 820, RLC 830, PDCP 840, and/or SDAP 847), the UDP/IP layer 852, and the GTP-U 853. The S-GW 222 and the P-GW 223 may utilize an S5/S8a interface to exchange user plane data via a protocol stack including an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 8, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 610. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 9:
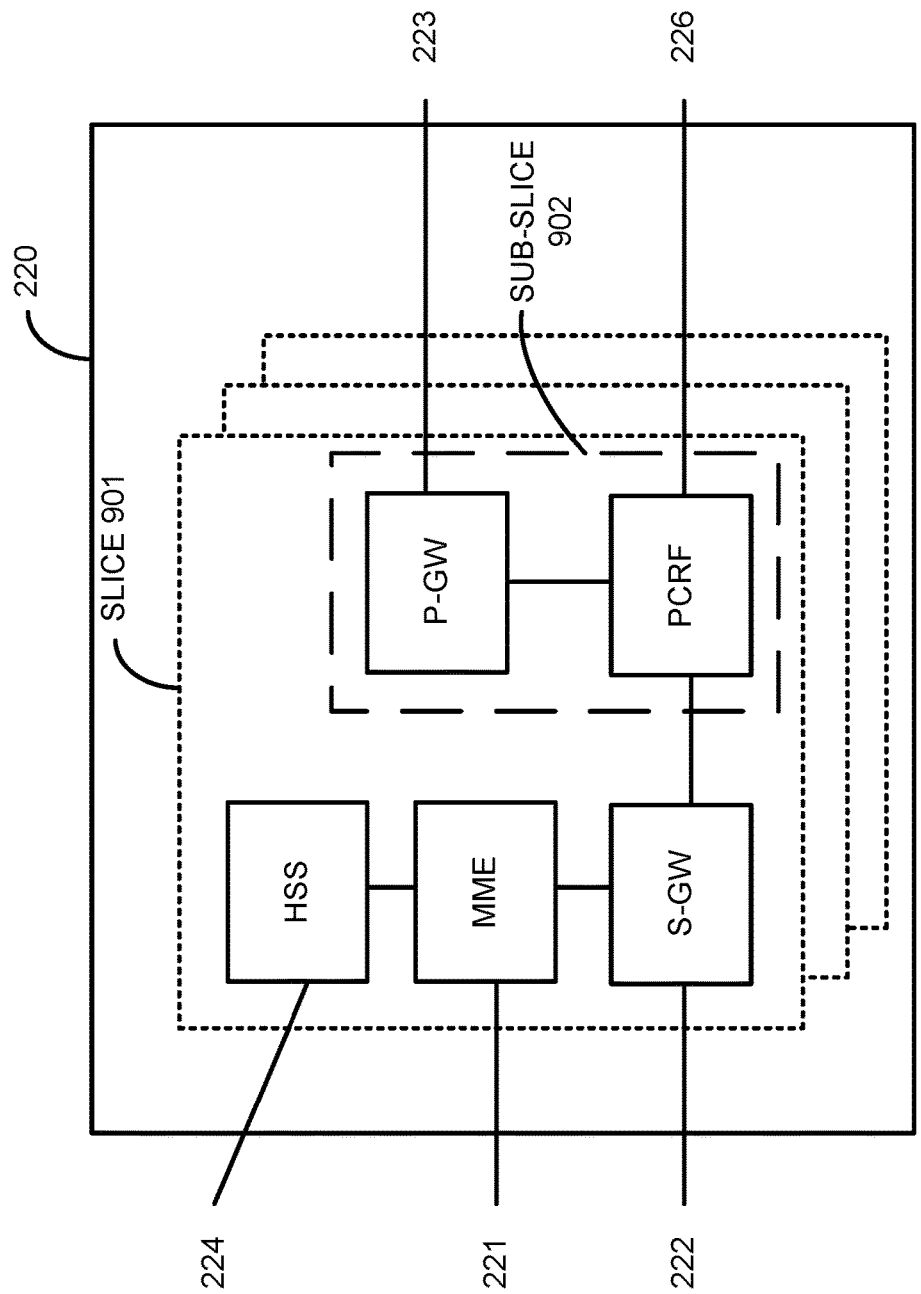
FIG. 9 is a block diagram illustrating example components of a core network.

FIG. 9 illustrates components of a core network in accordance with various embodiments. The components of the CN 220 may be implemented in one physical node or separate physical nodes including components to read and execute instructions from a machine-readable or computer-readable medium (e.g., a non-transitory machine-readable storage medium). In embodiments, the components of CN 320 may be implemented in a same or similar manner as discussed in this document with regard to the components of CN 220. In some embodiments, NFV is utilized to virtualize any or all of the above-described network node functions via executable instructions stored in one or more computer-readable storage mediums (described in further detail below). A logical instantiation of the CN 220 may be referred to as a network slice 901, and individual logical instantiations of the CN 220 may provide specific network capabilities and network characteristics. A logical instantiation of a portion of the CN 220 may be referred to as a network sub-slice 902 (e.g., the network sub-slice 902 is shown to include the P-GW 223 and the PCRF 226).

As used in this document, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 3), a network slice always includes a RAN part and a CN part. The support of network slicing relies on the principle that traffic for different slices is handled by different PDU sessions. The network can realize the different network slices by scheduling and also by providing different L1/L2 configurations. The UE 301 provides assistance information for network slice selection in an appropriate RRC message, if it has been provided by NAS. While the network can support large number of slices, the UE need not support more than 8 slices simultaneously.

A network slice may include the CN 320 control plane and user plane NFs, NG-RANs 310 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 301 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 321 instance serving an individual UE 301 may belong to each of the network slice instances serving that UE.

Network Slicing in the NG-RAN 310 involves RAN slice awareness. RAN slice awareness includes differentiated handling of traffic for different network slices, which have been pre-configured. Slice awareness in the NG-RAN 310 is introduced at the PDU session level by indicating the S-NSSAI corresponding to a PDU session in all signaling that includes PDU session resource information. How the NG-RAN 310 supports the slice enabling in terms of NG-RAN functions (e.g., the set of network functions that include each slice) is implementation dependent. The NG-RAN 310 selects the RAN part of the network slice using assistance information provided by the UE 301 or the 5GC 320, which unambiguously identifies one or more of the pre-configured network slices in the PLMN. The NG-RAN 310 also supports resource management and policy enforcement between slices as per SLAs. A single NG-RAN node may support multiple slices, and the NG-RAN 310 may also apply an appropriate RRM policy for the SLA in place to each supported slice. The NG-RAN 310 may also support QoS differentiation within a slice.

The NG-RAN 310 may also use the UE assistance information for the selection of an AMF 321 during an initial attach, if available. The NG-RAN 310 uses the assistance information for routing the initial NAS to an AMF 321. If the NG-RAN 310 is unable to select an AMF 321 using the assistance information, or the UE 301 does not provide any such information, the NG-RAN 310 sends the NAS signaling to a default AMF 321, which may be among a pool of AMFs 321. For subsequent accesses, the UE 301 provides a temp ID, which is assigned to the UE 301 by the 5GC 320, to enable the NG-RAN 310 to route the NAS message to the appropriate AMF 321 as long as the temp ID is valid. The NG-RAN 310 is aware of, and can reach, the AMF 321 that is associated with the temp ID. Otherwise, the method for initial attach applies.

The NG-RAN 310 supports resource isolation between slices. NG-RAN 310 resource isolation may be achieved by means of RRM policies and protection mechanisms that should avoid that shortage of shared resources if one slice breaks the service level agreement for another slice. In some implementations, it is possible to fully dedicate NG-RAN 310 resources to a certain slice. How NG-RAN 310 supports resource isolation is implementation dependent.

Some slices may be available only in part of the network. Awareness in the NG-RAN 310 of the slices supported in the cells of its neighbors may be beneficial for inter-frequency mobility in connected mode. The slice availability may not change within the UE's registration area. The NG-RAN 310 and the 5GC 320 are responsible to handle a service request for a slice that may or may not be available in a given area. Admission or rejection of access to a slice may depend on factors such as support for the slice, availability of resources, support of the requested service by NG-RAN 310.

The UE 301 may be associated with multiple network slices simultaneously. In case the UE 301 is associated with multiple slices simultaneously, only one signaling connection is maintained, and for intra-frequency cell reselection, the UE 301 tries to camp on the best cell. For inter-frequency cell reselection, dedicated priorities can be used to control the frequency on which the UE 301 camps. The 5GC 320 is to validate that the UE 301 has the rights to access a network slice. Prior to receiving an Initial Context Setup Request message, the NG-RAN 310 may be allowed to apply some provisional/local policies, based on awareness of a particular slice that the UE 301 is requesting to access. During the initial context setup, the NG-RAN 310 is informed of the slice for which resources are being requested.

Figure 10:
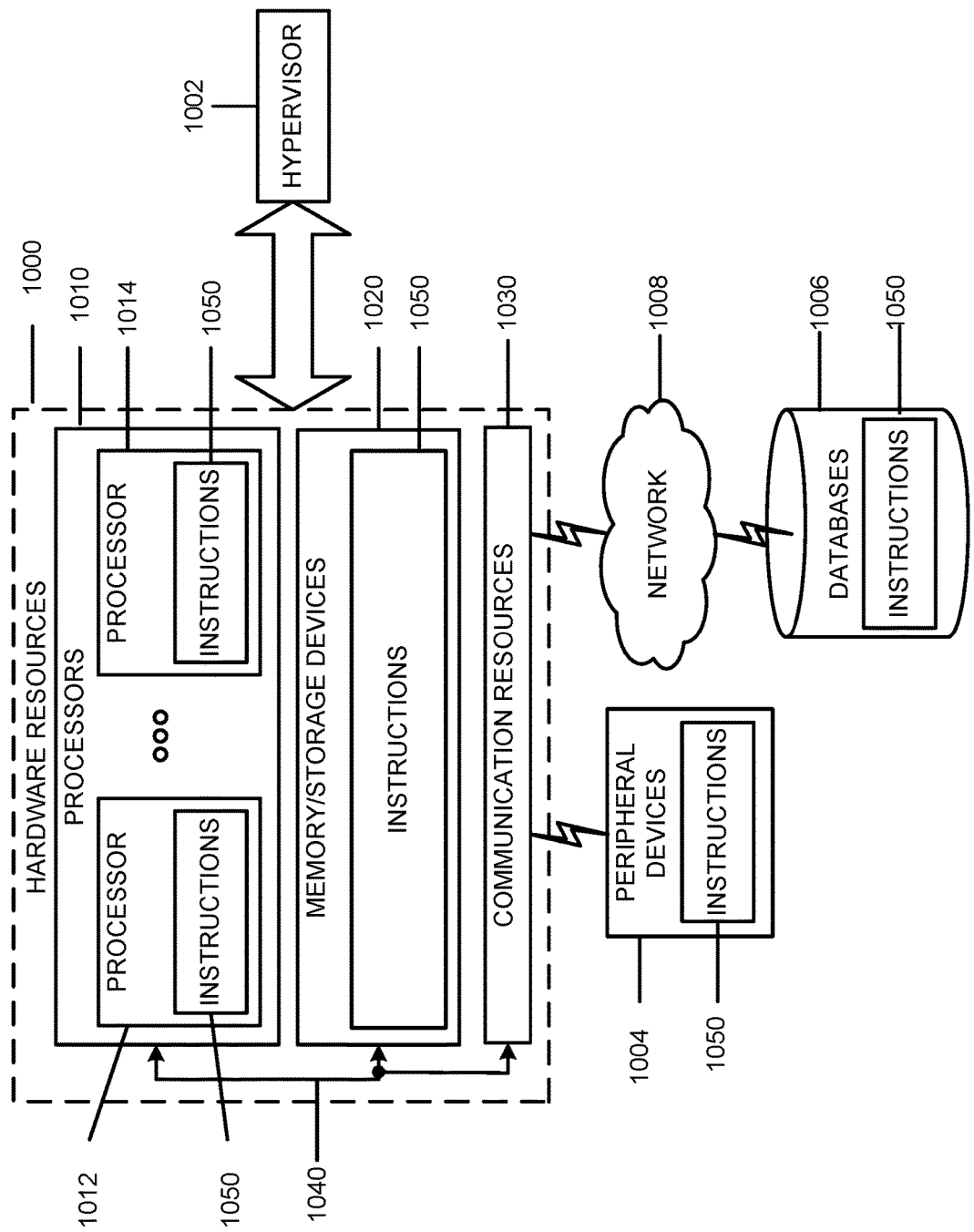
FIG. 10 is a block diagram of an example computing system for executing executable instructions.

FIG. 10 is a block diagram illustrating components, according to some example embodiments, able to read instructions from a machine-readable or computer-readable medium (e.g., a non-transitory machine-readable storage medium) and perform any one or more of the methodologies discussed in this document. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed in this document), or any suitable combination thereof.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 1050 may include software, a program, an application, an applet, an app, or other executable code for causing at least any of the processors 1010 to perform any one or more of the methodologies discussed in this document. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Generally, the term "circuitry" as used in this document refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used in this document refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used in this document refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used in this document refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used in this document refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used in this document refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used in this document refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used in this document refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used in this document refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used in this document refers to a connection between two devices through a RAT for the purpose of transmitting and receiving information.

The terms "instantiate," "instantiation," and the like as used in this document refers to the creation of an instance. An "instance" also refers to a concrete occurrence of an object, which may occur, for example, during execution of program code.

The terms "coupled," "communicatively coupled," along with derivatives thereof are used in this document. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content. The term "SMTC" refers to an SSB-based measurement timing configuration configured by SSB-MeasurementTimingConfiguration.

The term "SSB" refers to an SS/PBCH block. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a special cell for a UE configured with CA. The term "Secondary Cell Group" refers to the subset of serving cells including the PSCell and zero or more secondary cells for a UE configured with DC. The term "Serving Cell" refers to the primary cell for a UE in RRC_CONNECTED not configured with CA/DC there is only one serving cell including of the primary cell. The term "serving cell" or "serving cells" refers to the set of cells including the Special Cell(s) and all secondary cells for a UE in RRC_CONNECTED configured with CA. The term "Special Cell" refers to the PCell of the MCG or the PSCell of the SCG for DC operation; otherwise, the term "Special Cell" refers to the Pcell.

Figure 11:
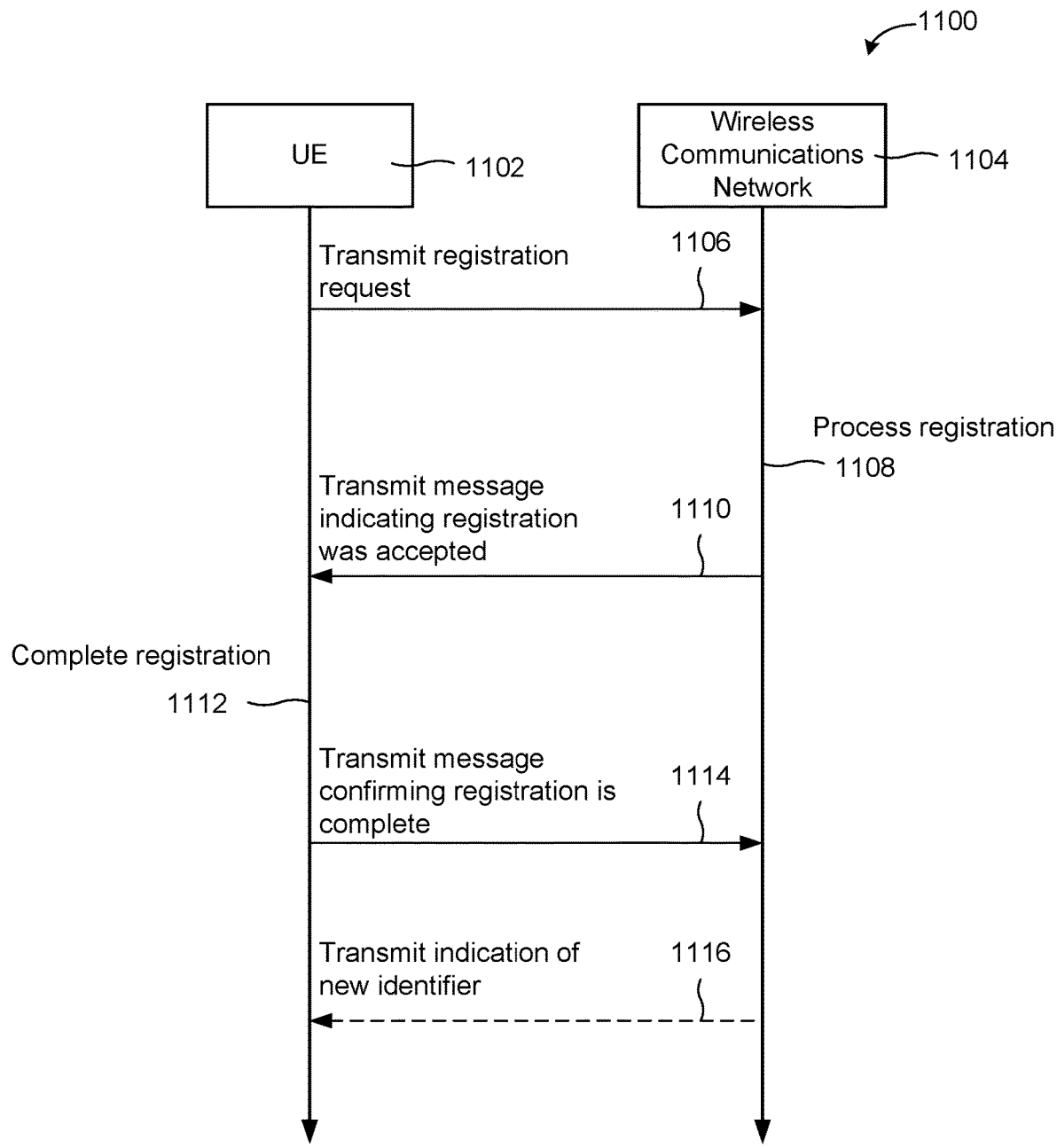
FIG. 11 is a diagram of an example process for registering a user equipment (UE) with a wireless communications network.
Figure 12:
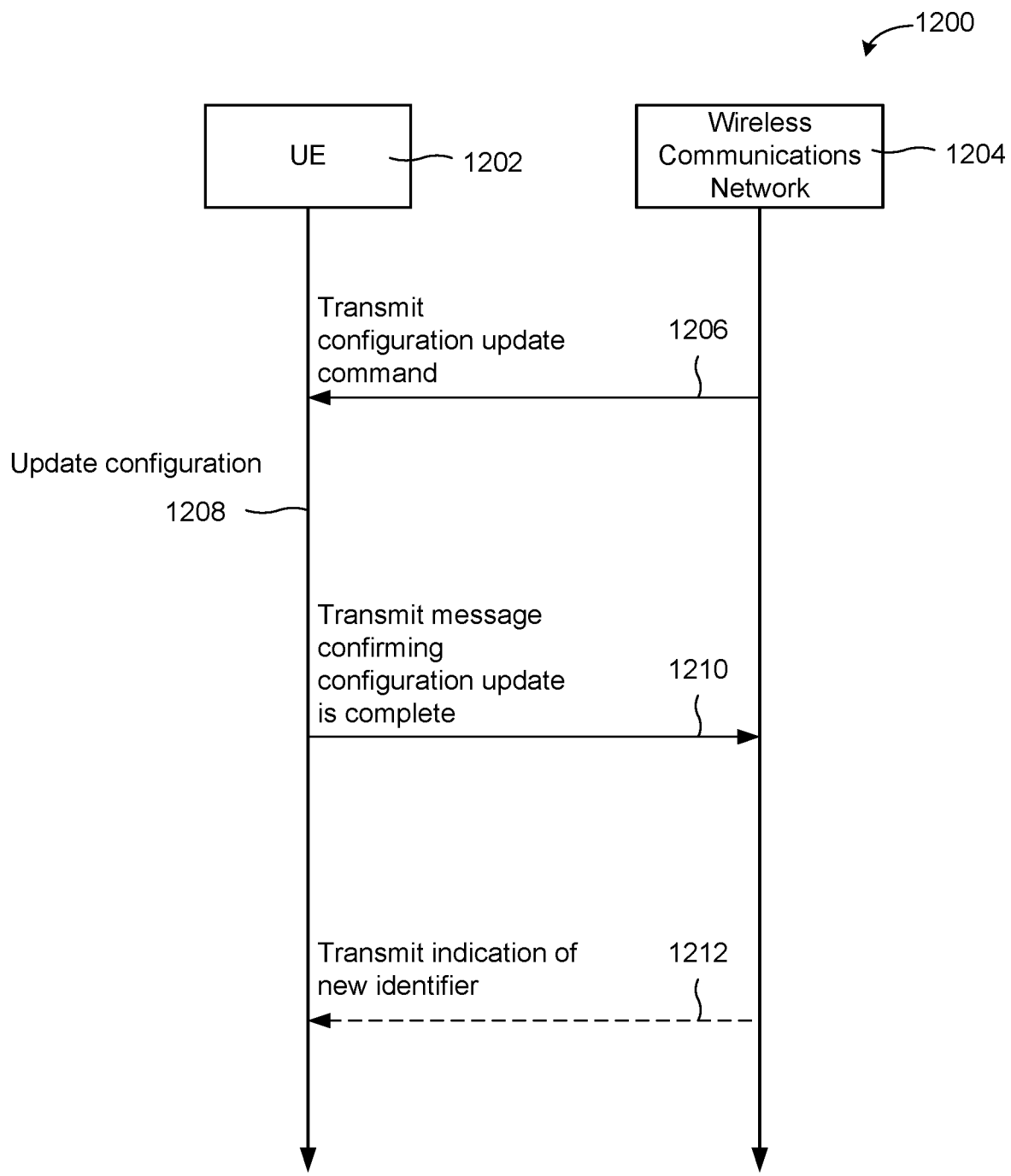
FIG. 12 is a diagram of an example process for modifying the registration of a UE with a wireless communications network.
Figure 13:
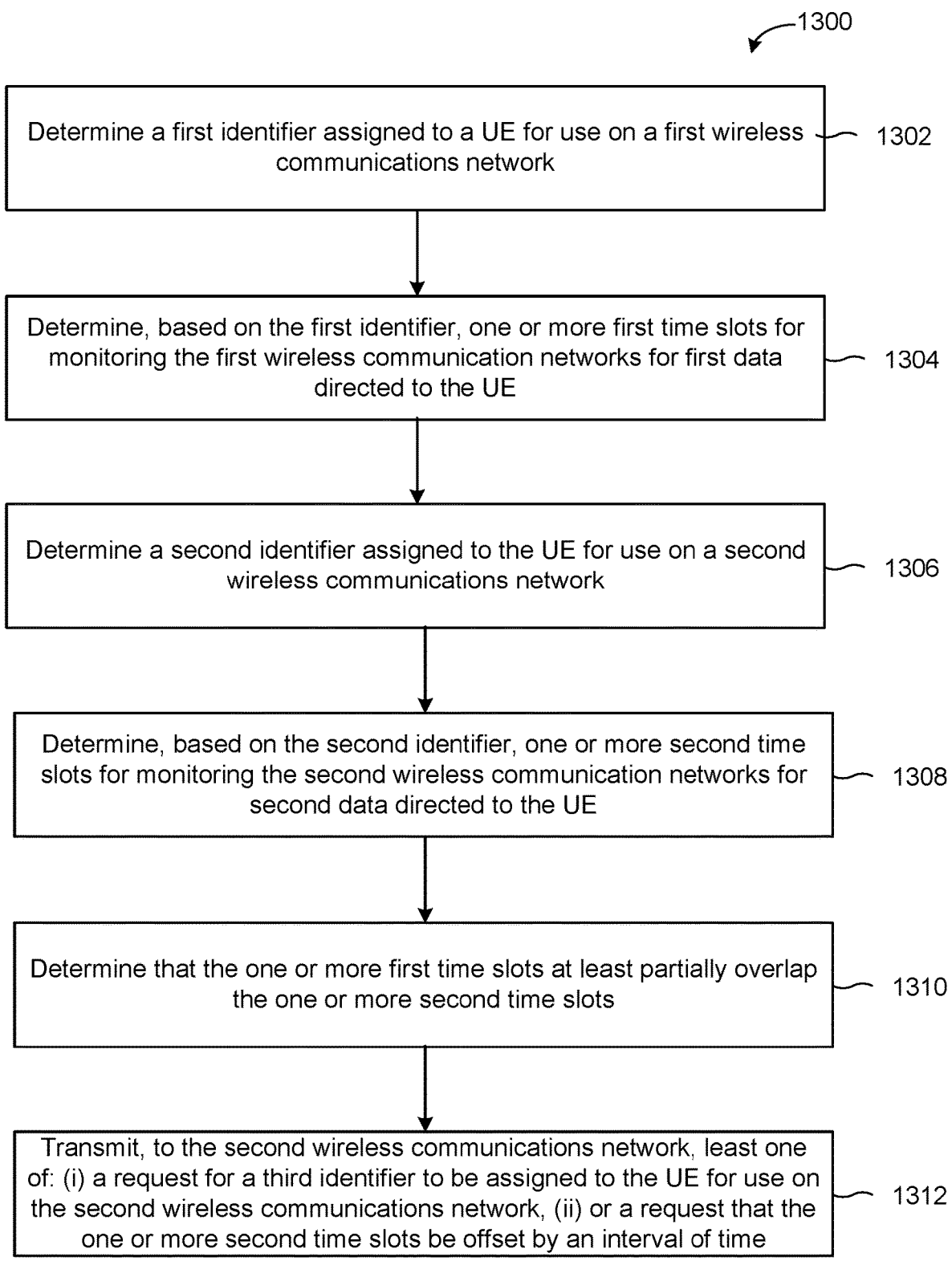
FIG. 13 is a block diagram of an example process for configuring a UE for use with a wireless communications network.

FIGS. 11-13 show example embodiments for avoiding paging collisions with respect to a wireless communications network. One or more of the described embodiments can be used in accordance with 3rd Generation Partnership Project (3GPP) technical specifications (TS), such as (but not limited to) 3GPP TS 23.502, 3GPP TS 36.304, and 3GPP TS 38.304 (the contents of which are incorporated by reference in their entirety).

In some implementations, a wireless communications network can send one or more paging messages to a user equipment (UE) to inform the UE of incoming transmissions to the UE (e.g., an incoming call or message), transmit information regarding changes in the configuration of the wireless communication network, transmit notifications to the UE, and/or to provide any other information to the UE. The UE can periodically monitor the wireless communications network for these paging messages during one or more "paging occasions" (e.g., one or more time slots or radio frames). As an example, during each paging occasion, the UE can awake from an idle power state, and determine whether a paging message has been sent to it from the wireless communications network during that time. If so, the UE can perform one or more operations in response to the contents of the paging message (e.g., establish a voice or data connection to receive a voice call or other data, adjust its configuration to account for a change in the wireless communications network, present a notification to a user, etc.). If no paging message is received, the UE can reenter the idle power state and monitor for a paging message during the next paging occasion.

In some implementations, paging occasions can be assigned algorithmically based on an identifier associated with the UE. For example, if the UE includes a Universal Subscriber Identity Module (USIM), the paging occasions for the UE can be determined according to a function having an identifier of the USIM as an input, and the paging occasions as an output. The identifier can be, for example, an International Mobile Subscriber Identity (IMSI) (e.g., for an Evolved Packet System (EPS)), or a 5G-Globally Unique Temporary Identifier (5G-GUTI) such as a 5G-S-Temporary Mobile Subscriber Identity (5G-S-TMSI) (e.g., for a Fifth Generation System (5GS)).

As an example, according to 3GPP TS 36.304 and TS 38.304, the following functions can be used to calculate paging frame (PF) and paging occasions (POs). The system frame number (SFN) for the PF can be determined by:

$$(SFN+PF_{offset}) \bmod T = (T \text{ div } N)*(UE_{ID} \bmod N) \quad \text{(Eq. 1)}$$

Further, Index (is), indicating the index of the PO is determined by:

$$i_s = \text{floor}\left(\frac{UE_{ID}}{N}\right) \bmod Ns, \quad \text{(Eq. 2)}$$

where $UE_{ID}$ is:
 $UE_{ID}$: IMSI mod 1024 (e.g., for an EPS), and
 $UE_{ID}$: 5G-S-TMSImod 1024 (e.g., for a 5GS).

If the UE only has a single USIM (e.g., to facilitate communications with a single wireless communications network or single type of wireless communications network at a time), the UE is assigned a single set of paging occasions (e.g., a single "paging cycle"). However, if a UE has multiple USIMs (e.g., to facilitate communications with multiple wireless communications networks or multiple types of wireless communications network concurrently), the UE may be assigned multiple different sets of paging occasions. If the different sets of paging occasions overlap or "collide" in the time domain, the UE may be unable to monitor for paging messages during each of the assigned paging occasions. For example, a UE may include a common radio and common baseband components that are used by each of the USIMs. If the UE is assigned two overlapping sets of paging occasions, while the UE's radio and baseband are in use during one set of paging occasions, they may unavailable for use during at least a portion of the other set of paging occasions. Thus, the UE may miss paging messages from one or more of the wireless communications networks.

For example, referring to Eqs. 1 and 2 above, the POs are determined only by the last 10 bits of the IMSI (e.g., for an EPS) or last 10 bits of the 5G-S-TMSI (e.g., for a 5GS). Whenever the last 10 bits of the $UE_{ID}$ in the two wireless communication networks to which the UE is registered are the same, there will be a full paging collision (e.g., a single Rx UE will systematically miss the pages in the other wireless communication network). Even when the last 10 bits of the $UE_{ID}$ in the two systems do not match fully, there can be combinations of $UE_{ID}$ that will lead to partial overlap of the POs, which can still lead to degraded performance with respect to the detection of paging messages.

To reduce the likelihood of a collision between sets of paging occasions, the UE can dynamically request that it be assigned a new identifier for use with a wireless communications network (e.g., a new identifier that does not result in a collision between its assigned paging occasions), or dynamically request that its assigned paging occasions be offset be a particular amount of time or a particular number of frames (e.g., to avoid collisions between its assigned paging occasions). In some implementations, the UE can dynamically make this request as a part of a registration process for a wireless communications network (e.g., when the UE initially registers for access to the wireless communications network). In some implementations, the UE can dynamically make this request as a part of a registration modification process for the wireless communication network (e.g., when the UE's registration is modified in some way after its initial registration).

As an example, FIG. 11 shows a simplified process 1100 for registering a UE 1102 with a wireless communications network 1104. For instance, the process 1100 can be performed to grant the UE 1102 access to the wireless communication network 1104 (e.g., to transmit and receive data across the wireless communication network) using a particular USIM.

In some implementations, the UE 1102 can be similar to the other UEs described herein (e.g., UEs 101, 201 and/or 301 shown in FIGS. 1, 2, and 3, respectively). In some implementations, the wireless communications network 1104 can include one or more of the network components described herein (e.g., RAN 110, CN 120, and/or application server 130 shown in FIG. 1, and/or any other network component described herein). In some implementations, the process 1100 can be performed, at least in part, according to 3GPP TS 23.502 (e.g., the process shown in FIG. 4.2.2.2.2-1 of 3GPP TS 23.502).

According to the process 1100, the UE 1102 transmits a registration request to the wireless communications network 1104 (step 1106). As an example, the UE 1102 can transmit a message according to step 1 of the process shown in FIG. 4.2.2.2.2-1 of 3GPP TS 23.502.

In response to the request, the wireless communications network 1104 processes the registration request (step 1108). As an example, the UE 1102 can process the request according to one or more of steps 2-19 of the process shown in FIG. 4.2.2.2.2-1 of 3GPP TS 23.502.

Upon successfully processing the registration request, the wireless communications network 1104 transmits a message to the UE 1102 indicating that the registration request is accepted (step 1110). As an example, the wireless communications network 1104 can transmit a message to the UE 1102 according to step 21 of the process shown in FIG. 4.2.2.2.2-1 of 3GPP TS 23.502. In some implementations, the message can be transmitted by an Access and Mobility Management Function (AMF) of the wireless communications network 1104 (e.g., the AMF 321 shown in FIG. 3) to the UE 1102.

In response, UE 1102 completes the registration process (step 1112), and transmits a message confirming that the registration is complete (step 1114). As an example, the UE 1102 can transmit a message to the wireless communications network 1104 according to step 22 of the process shown in FIG. 4.2.2.2.2-1 of 3GPP TS 23.502. In some implementations, the message can be transmitted by the UE 1102 to an AMF of the wireless communications network 1104 (e.g., the AMF 321 shown in FIG. 3).

During the process 1100, the wireless communications network 1104 can dynamically assign an identifier to the UE 1102 for use with respect to the wireless communications network 1104 (e.g., an identifier that uniquely identifies the UE 1102, and distinguishes it from other devices on the wireless communications network 1104, such as 5G-GUTI). As an example, if the wireless communications network 1104 is a 5GS, the wireless communications network 1104 can dynamically assign the UE 1102 a 5G-GUTI (e.g., a 5G-TMSI), and include an indication of the 5G-GUTI in the message indicating that the registration was accepted (e.g., the message transmitted in step 1110). In some implementations, assignment of an identifier can be performed, at least in part, by an AMF of the wireless communications network 1104 (e.g., the AMF 321 shown in FIG. 3).

Upon receiving the identifier, the UE 1102 can determine whether the identifier would result in paging collisions. For instance, if the UE 1102 is already registered with another wireless communications network using another USIM (e.g., an EPC or a 5GS), the UE 1102 can determine its paging occasions for each of the wireless communications networks. This can be determined, for example, using one or more functions having an identifier of the UE with respect to a wireless communication network as an input, and a paging occasions for that wireless communication network as an output. If the paging occasions at least partially overlap, the UE 1102 can determine that the identifier assigned to it by the wireless communications network 1104 would result in a paging collision. In some implementations, this determination can be performed by the UE 1102 as a part of the registration completion process (e.g., step 1112).

In some implementations, the UE 1102 can also consider whether the connection state of the USIM associated with the other wireless communications network. For example, if the UE 1102 determines that the USIM associated with the other wireless communications network is in a "detached" state or a "limited service state" (e.g., indicating that the UE is not connected to the other wireless communications network or is only used intermittently with the other wireless communication network), the UE 1102 can ignore the paging occasions associated with that USIM for the purposes of determining whether a paging collision would occur. As another example, if the UE 1102 determines that the USIM associated with the other wireless communications network is in a "connected" state (e.g., indicating that the UE 1102 is connected to the other wireless communications network and is in active use), the UE 1102 can consider the paging occasions associated with that USIM for the purposes of determining whether a paging collision would occur.

Upon determining that the identifier assigned to it by the wireless communications network 1104 would result in a paging collision, the UE 1102 transmits a request to the wireless communication network 1104 to modify its registration to avoid paging collisions. In some implementations, the UE 1102 can transmit a request to be assigned a new identifier for user with the wireless communications network 1104 (e.g., a new identifier, such as a new 5G-GUTI, that would not result in a collision with its other assigned paging occasions). In some implementations, the UE 1102 can transmit a request that its assigned paging occasions be offset be a particular amount of time or a particular number of frames (e.g., to avoid collisions between its other assigned paging occasions). In some implementations, this request can be included in the message confirming that the registration was completed (e.g., the message transmitted in step 1114). In some implementations, the request can be processed by an AMF of the wireless communications network 1104 (e.g., the AMF 321 shown in FIG. 3).

In some implementations, the UE 1102 can also transmit additional information to the wireless communications network 1104 to aid in the assignment of a new identifier and/or a time offset for the assigned paging occasions. In some implementations, this information also can be included in the message confirming that the registration was completed (e.g., the message transmitted in step 1114).

As an example, the UE 1102 can transmit at least a portion of the other identifiers that had been assigned to it by the other wireless communication networks (e.g., the last 10 bits of the 5G-S-TMSI or IMSI that identify the UE 1102 and/or its USIMs on the other wireless communication networks). The wireless communication network 1104 can use this information to determine a new identifier that would not result in a paging collisions (e.g., using one or more of the functions designed herein), assign the new identifier to the UE 1102, and transmit an indication of the new identifier to the UE 1102 (step 1116).

As another example, the UE 1102 can transmit a requested time offset for its assigned paging occasions for the wireless communication network 1104. If the wireless communication network 1104 accepts the requested time offset, the wireless communication network 1104 can propagate the requested time offset across the wireless communication network 1104 (e.g., the RAN). If the wireless communication network 1104 does not accept the requested time offset, the wireless communication network 1104 can assign a new identifier to the UE 1102 (e.g., such that it is assigned a new set of paging occasions that do not result in a paging collision) (step 1116).

Alternatively, if the UE 1102 determines that the identifier assigned to it by the wireless communications network 1104 would not result in a paging collision, the UE 1102 can include a confirmation of the assigned identifier in the message confirming that the registration was completed (e.g., the message transmitted in step 1114).

Upon completion of the process 1100, the UE 1102 monitors each of the wireless communication networks in accordance with the respective sets of paging occasions assigned to the UE 1102 (and if appropriate, according to the assigned time offsets for one or more of the paging occasions).

As described herein, in some implementations, the UE can dynamically request that it be assigned a new identifier (e.g., a new 5G-GUTI) for use with a wireless communications network or that its assigned paging occasions be offset be a particular amount of time or a particular number of frames, as a part of a registration modification process for the wireless communication network.

As an example, FIG. 12 shows a simplified process 1200 for modifying the registration of a UE 1202 with a wireless communications network 1204. For instance, the process 1200 can be performed to change a network configuration of the UE 1202 and/or the wireless communication network 1204 using a particular USIM, after an initial registration of the UE 1202.

In some implementations, the UE 1202 can be similar to the other UEs described herein (e.g., UEs 101, 201, 301, and 1202 shown in FIGS. 1, 2, 3, and 11, respectively). In some implementations, the wireless communications network 1204 can include one or more of the network components described herein (e.g., RAN 110, CN 120, and/or application server 130 shown in FIG. 1, and/or any other network component described herein). In some implementations, the process 1200 can be performed, at least in part, according to 3GPP TS 23.502 (e.g., the process shown in FIG. 4.2.4.2-1 of 3GPP TS 23.502).

According to the process 1200, the wireless communications network 1204 transmits a configuration update command to the UE 1202 (step 1206). The command can include one or more parameters (or updated parameters) specifying how the UE 1202 and wireless communication network 1204 can communicate with one another. As an example, the wireless communications network 1204 can transmit a command to the UE 1202 according to step 1 of the process shown in FIG. 4.2.4.2-1 of 3GPP TS 23.502. In some implementations, the message can be transmitted by an AMF of the wireless communications network 1204 (e.g., the AMF 321 shown in FIG. 3) to the UE 1202.

In response, UE 1202 updates its configuration in accordance with the command (step 1208), and transmits a message confirming that configuration update is complete (step 1210). As an example, the UE 1202 can transmit a message to the wireless communications network 1204 according to step 2a of the process shown in FIG. FIG. 4.2.4.2-1 of 3GPP TS 23.502. In some implementations, the message can be transmitted by the UE 1202 to an AMF of the wireless communications network 1204 (e.g., the AMF 321 shown in FIG. 3).

During the process 1200, the wireless communications network 1204 can dynamically assign an updated identifier to the UE 1202 for use with respect to the wireless communications network 1204 (e.g., an identifier that uniquely identifies the UE 1202, and distinguishes it from other devices on the wireless communications network 1204, such as a 5G-GUTI). As an example, if the wireless communications network 1204 is a 5GS, the wireless communications network 1204 can dynamically assign the UE 1202 a new 5G-GUTI (e.g., a 5G-TMSI), and include an indication of the new 5G-GUTI in the configuration update command (e.g., the command transmitted in step 1206). In some implementations, assignment of a new identifier can be performed, at least in part, by an AMF of the wireless communications network 1104 (e.g., the AMF 321 shown in FIG. 3).

In a similar manner as described above with respect to FIG. 11, upon receiving the identifier, the UE 1202 can determine whether the identifier would result in paging collisions. For instance, if the UE 1202 is already registered with another wireless communications network using another USIM (e.g., an EPC or a 5GS), the UE 1202 can determine its paging occasions for each of the wireless communications networks. This can be determined, for example, using one or more functions having an identifier of the UE with respect to a wireless communication network as an input, and a paging occasions for that wireless communication network as an output. If the paging occasions at least partially overlap, the UE 1202 can determine that the new identifier assigned to it by the wireless communications network 1204 would result in a paging collision. In some implementations, this determination can be performed by the UE 1202 as a part of the configuration update process (e.g., step 1208).

In some implementations, the UE 1202 can also consider whether the connection state of the USIM associated with the other wireless communications network. For example, if the UE 1202 determines that the USIM associated with the other wireless communications network is in a "detached" state or a "limited service state" (e.g., indicating that the UE is not connected to the other wireless communications network or is only used intermittently with the other wireless communication network), the UE 1202 can ignore the paging occasions associated with that USIM for the purposes of determining whether a paging collision would occur. As another example, if the UE 1202 determines that the USIM associated with the other wireless communications network is in a "connected" state (e.g., indicating that the UE 1202 is connected to the other wireless communications network and is in active use), the UE 1202 can consider the paging occasions associated with that USIM for the purposes of determining whether a paging collision would occur.

Upon determining that the new identifier assigned to it by the wireless communications network 1204 would result in a paging collision, the UE 1202 transmits a request to the wireless communication network 1204 to modify its registration to avoid paging collisions. In some implementations, the UE 1202 can transmit a request to be assigned a new identifier for use with the wireless communications network 1204 (e.g., a new identifier, such as a new 5G-GUTI, that would not result in a collision with its other assigned paging occasions). In some implementations, the UE 1202 can transmit a request that its assigned paging occasions be offset be a particular amount of time or a particular number of frames (e.g., to avoid collisions between its other assigned paging occasions). In some implementations, this request can be included in the message confirming that the configuration update was completed (e.g., the message transmitted in step 1210). In some implementations, the request can be processed by an AMF of the wireless communications network 1204 (e.g., the AMF 321 shown in FIG. 3).

In a similar manner as described above with respect to FIG. 11, in some implementations, the UE 1202 can also transmit additional information to the wireless communications network 1204 to aid in the assignment of a new identifier and/or a time offset for the assigned paging occasions. In some implementations, this information also can be included in the message confirming that the configuration update was completed (e.g., the message transmitted in step 1210).

As an example, the UE 1202 can transmit at least a portion of the other identifiers that had been assigned to it by the other wireless communication networks (e.g., the last 10 bits of the 5G-S-TMSI or IMSI that identify the UE 1102 and/or its USIMs on the other wireless communication networks). The wireless communication network 1204 can use this information to determine a new identifier that would not result in a paging collisions (e.g., using one or more of the functions designed herein), assign the new identifier to the UE 1202, and transmit an indication of the new identifier to the UE 1202 (step 1212). In some implementations, step 1212 can be similar to step 1206. For example, the wireless communication network 1204 can transmit to the UE 1202 another configuration update command including the new identifier.

As another example, the UE 1202 can transmit a requested time offset for its assigned paging occasions for the wireless communication network 1204. If the wireless communication network 1204 accepts the requested time offset, the wireless communication network 1204 can propagate the requested time offset across the wireless communication network 1204 (e.g., the RAN). If the wireless communication network 1204 does not accept the requested time offset, the wireless communication network 1204 can assign a new identifier to the UE 1202 (e.g., such that it is assigned a new set of paging occasions that do not result in a paging collision) (step 1212)

Alternatively, if the UE 1102 determines that the identifier assigned to it by the wireless communications network 1204 would not result in a paging collision, the UE 1202 can include a confirmation of the assigned identifier in the message confirming that the configuration update is compete (e.g., the message transmitted in step 1210).

Upon completion of the process 1200, the UE 1202 monitors each of the wireless communication networks in accordance with the respective sets of paging occasions assigned to the UE 1202 (and if appropriate, according to the assigned time offsets for one or more of the paging occasions).

FIG. 13 is a flow chart that illustrates an example process 1300 for configuring a UE for use with a wireless communications network. The process 1300 includes steps for execution by the electronic device(s), network(s), system(s), chip(s) or component(s), or portions or implementations thereof, of FIGS. 1-12, that may be configured to perform one or more processes, techniques, or methods as described herein, or portions thereof.

According to the process 1300, a UE determines a first identifier assigned to the UE for use on a first wireless communications network (step 1302). In some implementations, the first identifier can be associated with a first USIM of the UE. As an example, the first identifier can be an IMSI (e.g., for an EPS), or a 5G-GUTI such as a 5G-S-TMSI (e.g., for a 5GS).

The UE determines, based on the first identifier, one or more first time slots for monitoring the first wireless communication networks for first data directed to the UE (step 1304). In some implementations, the first data can include one or more first paging messages from the first communications network. In some implementations, the one or more first time slots (e.g., a first set of paging occasions) can be determined based on a first function having at least a portion of the first identifier as an input.

The UE determines a second identifier assigned to the UE for use on a second wireless communications network (step 1306). In some implementations, the second data can include one or more paging messages from the second communications network. As an example, the second identifier can be an IMSI (e.g., for an EPS), or a 5G-GUTI such as a 5G-S-TMSI (e.g., for a 5GS).

In some implementations, the UE can determine the second identifier by transmitting a first message to the second wireless communications network, where the first message includes a request to register the UE with respect to the second wireless communications network. Further, the UE can receive a second message from the second wireless communications network, the second message including an indication that the request has been accepted, and an indication of the second identifier. In some implementations, the second message can be received from an AMF of the second wireless communications network. Additional details regarding this process are described, for example, with respect to FIG. 11.

In some implementations, the UE can determine the second identifier by receiving a message from the second wireless communications network, where the message includes an indication of a modification to a registration of the UE with respect to the second wireless communications network, and an indication of the second identifier. In some implementations, the message can be received from an AMF of the second wireless communications network. Additional details regarding this process are described, for example, with respect to FIG. 12.

The UE determines, based on the second identifier, one or more second time slots for monitoring the second wireless communication networks for second data directed to the UE (step 1308). In some implementations, the second identifier can be associated with a second USIM of the UE, where the second USIM is different from the first USIM. In some implementations, the one or more second time slots (e.g., a second set of paging occasions) can be determined based on a second function having at least a portion of the second identifier as an input.

The UE determines that the one or more first time slots at least partially overlap the one or more second time slots (step 1310).

In response to determining that the one or more first time slots at least partially overlap the one or more second time slots, the UE transmits, to the second wireless communications network, least one of (i) a request for a third identifier to be assigned to the UE for use on the second wireless communications network, where the third identifier is different from the second identifier, or (ii) a request that the one or more second time slots be offset by an interval of time (step 1312).

In some implementations, the request for the third identifier can include an indication of at least a portion of the first identifier (e.g., at least a subset of the digits and/or characters of the IMSI or 5G-GUTI).

In some implementations, the request that the one or more second time slots be offset by the interval of time can include an indication of the interval of time.

In some implementations, the UE can receive an indication of the third identifier from the second wireless communications network, and determine, based on the third identifier, one or more third time slots for monitoring the second wireless communication networks for the second data directed to the UE. Further, the UE can monitor the first wireless communication networks for the first data directed to the UE during the one or more first time slots, and monitor the second wireless communication networks for the second data directed to the UE during the one or more third time slots.

In some implementations, the UE can determining, based on the third identifier, one or more third time slots for monitoring the second wireless communication networks for the second data directed to the UE. Determining the one or more third time slots can include offsetting the one or more second time by the interval of time. Further, the UE can monitor the first wireless communication networks for the first data directed to the UE during the one or more first time slots, and monitor the second wireless communication networks for the second data directed to the UE during the one or more second time slots.

In some implementations, at least one of the first identifier, the second identifier, or the third identifier is a Fifth Generation Temporary Mobile Subscriber Identity (5G-TMSI) in accordance with 3rd Generation Partnership Project (3GPP) technical standards.

In some implementations, the first wireless communications network can be a Fourth Generation (4G) network in accordance with 3GPP technical standards, and the second wireless communications network can be a 5G network in accordance with 3GPP technical standards. Further, the first identifier can be a IMSI, and the second identifier and the third identifier can be 5G-GUTIs in accordance with 3GPP technical standards.

In some implementations, both the first wireless communications network and the second wireless communications network can be 5G networks in accordance with 3GPP technical standards. Further, the first identifier, the second identifier, and the third identifier can be 5G-GUTIs in accordance with 3GPP technical standards.

The disclosure herein makes reference to 3GPP TS 23.502, 3GPP TS 36.304, and 3GPP TS 38.304. The contents of each of these technical specifications is incorporated by reference in their entirety.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. For purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B). Other allocations of functionality are envisioned and may fall within the scope of claims that follow. Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Example implementations of the features described herein are provided below.

Example 1: a method includes: (i) determining, by a user equipment (UE), a first identifier associated with a first universal subscriber identity module (USIM) of the UE for use on a first wireless communications network; (ii) determining, by the UE based on the first identifier, one or more first time slots for monitoring the first wireless communication networks for first data directed to the UE; (iii) determining, by the UE, a second identifier associated with a second USIM of the UE for use on a second wireless communications network, where one of the first network or the second network includes an Evolved Packet System (EPS) and another one of the first network or the second network includes a Fifth Generation System (5GS); (iv) determining, by the UE based on the second identifier, one or more second time slots for monitoring the second wireless communication networks for second data directed to the UE; (v) determining, by the UE, that the one or more first time slots at least partially overlap the one or more second time slots; and (vi) responsive to determining that the one or more first time slots at least partially overlap the one or more second time slots, generating, by the UE to the second wireless communications network, at least one of: a request for a third identifier to be assigned to the UE for use on the second wireless communications network, where the third identifier is different from the second identifier, or a request that the one or more second time slots be offset by an interval of time.

Example 2: a method includes the method of Example 1. Further, the first data includes one or more first paging messages from the first communications network.

Example 3: a method includes the method of Example 2. Further, the second data includes one or more paging messages from the second communications network.

Example 4: a method includes the method of Example 1. Further, the one or more first time slots are determined based on a first function having at least a portion of the first identifier as an input.

Example 5: a method includes the method of Example 1. Further, the one or more second time slots are determined based on a second function having at least a portion of the second identifier as an input.

Example 6: a method includes the method of Example 1. Further, determining the second identifier includes: transmitting, by the UE, a first message to the second wireless communications network, the first message including a request to register the UE with respect to the second wireless communications network; and receiving, by the UE, a second message from the second wireless communications network, the second message including: an indication that the request has been accepted, and an indication of the second identifier.

Example 7: a method includes the method of Example 6. Further, the second message is received from an Access and Mobility Management Function (AMF) of the second wireless communications network.

Example 8: a method includes the method of Example 1. Further, determining the second identifier includes receiving, by the UE, a message from the second wireless communications network, where the message includes: an indication of a modification to a registration of the UE with respect to the second wireless communications network, and an indication of the second identifier.

Example 9: a method includes the method of Example 8. Further, the message is received from an Access and Mobility Management Function (AMF) of the second wireless communications network.

Example 10: a method includes the method of Example 1. Further, the request for the third identifier includes an indication of at least a portion of the first identifier.

Example 11: a method includes the method of Example 1. Further, the request that the one or more second time slots be offset by the interval of time includes an indication of the interval of time.

Example 12: a method includes the method of Example 1. Further, the method includes: receiving, by the UE device, an indication of the third identifier from the second wireless communications network; determining, by the UE based on the third identifier, one or more third time slots for monitoring the second wireless communication networks for the second data directed to the UE; monitoring, by the UE, the first wireless communication networks for the first data directed to the UE during the one or more first time slots; and monitoring, by the UE, the second wireless communication networks for the second data directed to the UE during the one or more third time slots.

Example 13: a method includes the method of Example 1. Further, the method includes: determining, by the UE based on the third identifier, one or more third time slots for monitoring the second wireless communication networks for the second data directed to the UE, where determining the one or more third time slots includes offsetting the one or more second time by the interval of time; monitoring, by the UE, the first wireless communication networks for the first data directed to the UE during the one or more first time slots; and monitoring, by the UE, the second wireless communication networks for the second data directed to the UE during the one or more second time slots.

Example 14: a method includes the method of Example 1. Further, the first identifier is an international mobile subscriber identity (IMSI), and the second identifier and the third identifier are Fifth Generation Globally Unique Temporary Identities (5G-GUTIs).

Example 15: a system includes one or more processors; and memory storing instructions that when executed by the one or more processors, cause the one or more processors to perform various operations. The operations include: (i) determining, by a user equipment (UE), a first identifier associated with a first universal subscriber identity module (USIM) of the UE for use on a first wireless communications network; (ii) determining, by the UE based on the first identifier, one or more first time slots for monitoring the first wireless communication networks for first data directed to the UE; (iii) determining, by the UE, a second identifier associated with a second USIM of the UE for use on a second wireless communications network, where one of the first network or the second network includes an Evolved Packet System (EPS) and another one of the first network or the second network includes a Fifth Generation System (5GS); (iv) determining, by the UE based on the second identifier, one or more second time slots for monitoring the second wireless communication networks for second data directed to the UE; (v) determining, by the UE, that the one or more first time slots at least partially overlap the one or more second time slots; and (vi) responsive to determining that the one or more first time slots at least partially overlap the one or more second time slots, generating, by the UE to the second wireless communications network, at least one of: a request for a third identifier to be assigned to the UE for use on the second wireless communications network, where the third identifier is different from the second identifier, or a request that the one or more second time slots be offset by an interval of time.

Example 16: a system includes the system of Example 15. Further, the first data includes one or more first paging messages from the first communications network.

Example 17: a system includes the system of Example 16. Further, the second data includes one or more paging messages from the second communications network.

Example 18: a system includes the system of Example 15. Further, the one or more first time slots are determined based on a first function having at least a portion of the first identifier as an input.

Example 19: a system includes the system of Example 15. Further, the one or more second time slots are determined based on a second function having at least a portion of the second identifier as an input.

Example 20: a system includes the system of Example 15. Further, determining the second identifier includes: transmitting, by the UE, a first message to the second wireless communications network, the first message including a request to register the UE with respect to the second wireless communications network; and receiving, by the UE, a second message from the second wireless communications network, the second message including: an indication that the request has been accepted, and an indication of the second identifier.

Example 21: a system includes the system of Example 20. Further, the second message is received from an Access and Mobility Management Function (AMF) of the second wireless communications network.

Example 22: a system includes the system of Example 15. Further, determining the second identifier includes receiving, by the UE, a message from the second wireless communications network, where the message includes: an indication of a modification to a registration of the UE with respect to the second wireless communications network, and an indication of the second identifier.

Example 23: a system includes the system of Example 22. Further, the message is received from an Access and Mobility Management Function (AMF) of the second wireless communications network.

Example 24: a system includes the system of Example 15. Further, the request for the third identifier includes an indication of at least a portion of the first identifier.

Example 25: a system includes the system of Example 15. Further, the request that the one or more second time slots be offset by the interval of time includes an indication of the interval of time.

Example 26: a system includes the system of Example 15. Further, the operations also include: receiving, by the UE device, an indication of the third identifier from the second wireless communications network; determining, by the UE based on the third identifier, one or more third time slots for monitoring the second wireless communication networks for the second data directed to the UE; monitoring, by the UE, the first wireless communication networks for the first data directed to the UE during the one or more first time slots; and monitoring, by the UE, the second wireless communication networks for the second data directed to the UE during the one or more third time slots.

Example 27: a system includes the system of Example 15. Further, the operations also include: determining, by the UE based on the third identifier, one or more third time slots for monitoring the second wireless communication networks for the second data directed to the UE, where determining the one or more third time slots includes offsetting the one or more second time by the interval of time; monitoring, by the UE, the first wireless communication networks for the first data directed to the UE during the one or more first time slots; and monitoring, by the UE, the second wireless communication networks for the second data directed to the UE during the one or more second time slots.

Example 28: a system includes the system of Example 15. Further, the first identifier is an international mobile subscriber identity (IMSI), and the second identifier and the third identifier are Fifth Generation Globally Unique Temporary Identities (5G-GUTIs).

Example 29: one or more non-transitory, computer-readable storage media have instructions stored thereon, that when executed by one or more processors, cause the one or more processors to perform various operations. The operations include: (i) determining, by a user equipment (UE), a first identifier associated with a first universal subscriber identity module (USIM) of the UE for use on a first wireless communications network; (ii) determining, by the UE based on the first identifier, one or more first time slots for monitoring the first wireless communication networks for first data directed to the UE; (iii) determining, by the UE, a second identifier associated with a second USIM of the UE for use on a second wireless communications network, where one of the first network or the second network includes an Evolved Packet System (EPS) and another one of the first network or the second network includes a Fifth Generation System (5GS); (iv) determining, by the UE based on the second identifier, one or more second time slots for monitoring the second wireless communication networks for second data directed to the UE; (v) determining, by the UE, that the one or more first time slots at least partially overlap the one or more second time slots; and (vi) responsive to determining that the one or more first time slots at least partially overlap the one or more second time slots, generating, by the UE to the second wireless communications network, at least one of: a request for a third identifier to be assigned to the UE for use on the second wireless communications network, where the third identifier is different from the second identifier, or a request that the one or more second time slots be offset by an interval of time.

Example 30: one or more non-transitory, computer-readable storage media include the one or more non-transitory, computer-readable storage media of Example 29. Further, the first data includes one or more first paging messages from the first communications network.

Example 31: one or more non-transitory, computer-readable storage media include the one or more non-transitory, computer-readable storage media of Example 30. Further, the second data includes one or more paging messages from the second communications network.

Example 32: one or more non-transitory, computer-readable storage media include the one or more non-transitory, computer-readable storage media of Example 29. Further, the one or more first time slots are determined based on a first function having at least a portion of the first identifier as an input.

Example 33: one or more non-transitory, computer-readable storage media include the one or more non-transitory, computer-readable storage media of Example 29. Further, the one or more second time slots are determined based on a second function having at least a portion of the second identifier as an input.

Example 34: one or more non-transitory, computer-readable storage media include the one or more non-transitory, computer-readable storage media of Example 29. Further, determining the second identifier includes: transmitting, by the UE, a first message to the second wireless communications network, the first message including a request to register the UE with respect to the second wireless communications network; and receiving, by the UE, a second message from the second wireless communications network, the second message including: an indication that the request has been accepted, and an indication of the second identifier.

Example 35: one or more non-transitory, computer-readable storage media include the one or more non-transitory, computer-readable storage media of Example 34. Further, the second message is received from an Access and Mobility Management Function (AMF) of the second wireless communications network.

Example 36: one or more non-transitory, computer-readable storage media include the one or more non-transitory, computer-readable storage media of Example 29. Further, determining the second identifier includes receiving, by the UE, a message from the second wireless communications network, where the message includes: an indication of a modification to a registration of the UE with respect to the second wireless communications network, and an indication of the second identifier.

Example 37: one or more non-transitory, computer-readable storage media include the one or more non-transitory, computer-readable storage media of Example 36. Further, the message is received from an Access and Mobility Management Function (AMF) of the second wireless communications network.

Example 38: one or more non-transitory, computer-readable storage media include the one or more non-transitory, computer-readable storage media of Example 29. Further, the request for the third identifier includes an indication of at least a portion of the first identifier.

Example 39: one or more non-transitory, computer-readable storage media include the one or more non-transitory, computer-readable storage media of Example 29. Further, the request that the one or more second time slots be offset by the interval of time includes an indication of the interval of time.

Example 40: one or more non-transitory, computer-readable storage media include the one or more non-transitory, computer-readable storage media of Example 29. Further, the operations also include: receiving, by the UE device, an indication of the third identifier from the second wireless communications network; determining, by the UE based on the third identifier, one or more third time slots for monitoring the second wireless communication networks for the second data directed to the UE; monitoring, by the UE, the first wireless communication networks for the first data directed to the UE during the one or more first time slots; and monitoring, by the UE, the second wireless communication networks for the second data directed to the UE during the one or more third time slots.

Example 41: one or more non-transitory, computer-readable storage media include the one or more non-transitory, computer-readable storage media of Example 29. Further, the operations also include: determining, by the UE based on the third identifier, one or more third time slots for monitoring the second wireless communication networks for the second data directed to the UE, where determining the one or more third time slots includes offsetting the one or more second time by the interval of time; monitoring, by the UE, the first wireless communication networks for the first data directed to the UE during the one or more first time slots; and monitoring, by the UE, the second wireless communication networks for the second data directed to the UE during the one or more second time slots.

Example 42: one or more non-transitory, computer-readable storage media include the one or more non-transitory, computer-readable storage media of Example 29. Further, the first identifier is an international mobile subscriber identity (IMSI), and the second identifier and the third identifier are Fifth Generation Globally Unique Temporary Identities.

Example 43: a method includes the method of Example 1. Further, the request for the third identifier includes an indication of only a portion of the first identifier.

Example 44: a method includes the method of Example 43. Further, the portion of the first identifier is a trailing portion of the first identifier.

Example 45: a method includes the method of Example 1. Further, the first identifier is an Fifth Generation Globally Unique Temporary Identity (5G-GUTI), and the second identifier and the third identifiers are international mobile subscriber identities (IMSIs).

Example 46: a method includes the method of Example 1. Further, the method includes determining that the first USIM and the second USIM are in a connected state; and responsive to determining that the first USIM and the second USIM are in the connected state, determining whether the one or more first time slots at least partially overlap the one or more second time slots.

Example 47: a method includes the method of Example 1. Further, the method includes: determining that neither of the first USIM nor the second USIM is in a detached state or a limited service state, and responsive to determining that neither of the first USIM or the second USIM is in the detached state or the limited service state, determining whether the one or more first time slots at least partially overlap the one or more second time slots.

Example 48: a system includes the system of Example 15. Further, the request for the third identifier includes an indication of only a portion of the first identifier.

Example 49: a system includes the system of Example 48. Further, the portion of the first identifier is a trailing portion of the first identifier.

Example 50: a system includes the system of Example 15. Further, the first identifier is an Fifth Generation Globally Unique Temporary Identity (5G-GUTI), and the second identifier and the third identifiers are international mobile subscriber identities (IMSIs), Example 51: a system includes the system of Example 15. Further, the operations also include: determining that the first USIM and the second USIM are in a connected state, and responsive to determining that the first USIM and the second USIM are in the connected state, determining whether the one or more first time slots at least partially overlap the one or more second time slots.

Example 52: a system includes the system of Example 15. Further, the operations also include: determining that neither of the first USIM nor the second USIM is in a detached state or a limited service state, and responsive to determining that neither of the first USIM or the second USIM is in the detached state or the limited service state, determining whether the one or more first time slots at least partially overlap the one or more second time slots.

Example 53: one or more non-transitory, computer-readable storage media include the one or more non-transitory, computer-readable storage media of Example 29. Further, the request for the third identifier includes an indication of only a portion of the first identifier.

Example 54: one or more non-transitory, computer-readable storage media include the one or more non-transitory, computer-readable storage media of Example 53. Further, the portion of the first identifier is a trailing portion of the first identifier.

Example 55: one or more non-transitory, computer-readable storage media include the one or more non-transitory, computer-readable storage media of Example 29. Further, the first identifier is an Fifth Generation Globally Unique Temporary Identity (5G-GUTI), and the second identifier and the third identifiers are international mobile subscriber identities (IMSIs).

Example 56: one or more non-transitory, computer-readable storage media include the one or more non-transitory, computer-readable storage media of Example 29. Further, the operations also include: determining that the first USIM and the second USIM are in a connected state; and responsive to determining that the first USIM and the second USIM are in the connected state, determining whether the one or more first time slots at least partially overlap the one or more second time slots.

Example 57: one or more non-transitory, computer-readable storage media include the one or more non-transitory, computer-readable storage media of Example 29. Further, the operations also include: determining that neither of the first USIM nor the second USIM is in a detached state or a limited service state; and responsive to determining that neither of the first USIM or the second USIM is in the detached state or the limited service state, determining whether the one or more first time slots at least partially overlap the one or more second time slots.

Example 58: a method includes (I) receiving, by a first wireless communications network, a first message from a user equipment (UE) communicatively coupled to the first wireless communications network and to a wireless second communications network, where the UE equipment has been assigned a first identifier that is associated with a first universal subscriber identity module (USIM) of the UE for use on a first wireless communications network, where the UE equipment has been assigned a second identifier that is associated with a second USIM of the UE for use on the second wireless communications network, where one of the first network or the second network includes an Evolved Packet System (EPS) and another one of the first network or the second network includes a Fifth Generation System (5GS), where the first message is indicative of a paging collision between (i) one or more first time slots for monitoring the first wireless communication networks by the UE for first data directed to the UE, and (ii) one or more second time slots for monitoring the second wireless communication networks by the UE for second data directed to the UE, and where the first message includes at least one of: a request for a third identifier to be assigned to the UE for use on the first wireless communications network, where the third identifier is different from the first identifier, or a request that the one or more first time slots be offset by an interval of time; and (II) responsive to receiving the first message, transmitting, by the first wireless communications network, a second message to the UE, where the second message includes at least one of: an indication of the third identifier, or a confirmation of an offset of the one or more first time slots by the interval of time.

Example 59: a method includes the method of Example 58. Further, the first message is received by an Access and Mobility Management Function (AMF) of the first wireless communication network.

Example 60: a method includes the method of Example 58. Further, the second message is transmitted by an Access and Mobility Management Function (AMF) of the first wireless communication network.

Example 61: a method includes the method of Example 58. Further, the first message includes an indication of at least a portion of the second identifier.

Example 62: a method includes the method of Example 61. Further, the method includes: determining, by the first wireless communications network, the one or more second time slots based on at least the portion of the second identifier; and determining, by the first wireless communications network, the first identifier based on the one or more second time slots.

Example 63: a method includes the method of Example 62. Further, the one or more second time slots are determined based on a function having at least the portion of the second identifier as an input.

Example 64: a method includes the method of Example 61. Further, the method includes: determining, by the first wireless communications network, the one or more second time slots based on at least the portion of the second identifier; and determining, by the first wireless communications network, that the one or more first time slots, when offset by the interval of time, do not overlap with the one or more second time slots.

Example 65: a method includes the method of Example 64. Further, the one or more second time slots are determined based on a function having at least the portion of the second identifier as an input.

Example 66: a method includes the method of Example 58. Further, the first message includes an indication of only a portion of the second identifier.

Example 67: a method includes the method of Example 66. Further, the portion of the second identifier is a trailing portion of the second identifier.

Example 68: a method includes the method of Example 58. Further, the first identifier is an Fifth Generation Globally Unique Temporary Identity (5G-GUTI), and the second identifier and the third identifiers are international mobile subscriber identities (IMSIs).

Example 69: a method includes the method of Example 58. Further, the first identifier is an international mobile subscriber identity (IMSI), and the second identifier and the third identifiers are Fifth Generation Globally Unique Temporary Identities (5G-GUTIs).

Example 70: a system includes: one or more processors; and memory storing instructions that when executed by the one or more processors, cause the one or more processors to perform various operations. The operations include: (I) receiving, by a first wireless communications network, a first message from a user equipment (UE) communicatively coupled to the first wireless communications network and to a wireless second communications network, where the UE equipment has been assigned a first identifier that is associated with a first universal subscriber identity module (USIM) of the UE for use on a first wireless communications network, where the UE equipment has been assigned a second identifier that is associated with a second USIM of the UE for use on the second wireless communications network, where one of the first network or the second network includes an Evolved Packet System (EPS) and another one of the first network or the second network includes a Fifth Generation System (5GS), where the first message is indicative of a paging collision between (i) one or more first time slots for monitoring the first wireless communication networks by the UE for first data directed to the UE, and (ii) one or more second time slots for monitoring the second wireless communication networks by the UE for second data directed to the UE, and where the first message includes at least one of: a request for a third identifier to be assigned to the UE for use on the first wireless communications network, where the third identifier is different from the first identifier, or a request that the one or more first time slots be offset by an interval of time; and (II) responsive to receiving the first message, transmitting, by the first wireless communications network, a second message to the UE, where the second message includes at least one of: an indication of the third identifier, or a confirmation of an offset of the one or more first time slots by the interval of time.

Example 71: a system includes the system of Example 70. Further, the first message is received by an Access and Mobility Management Function (AMF) of the first wireless communication network.

Example 72: a system includes the system of Example 70. Further, the second message is transmitted by an Access and Mobility Management Function (AMF) of the first wireless communication network.

Example 73: a system includes the system of Example 70. Further, the first message includes an indication of at least a portion of the second identifier.

Example 74: a system includes the system of Example 73. Further, the operations also include: determining, by the first wireless communications network, the one or more second time slots based on at least the portion of the second identifier, and determining, by the first wireless communications network, the first identifier based on the one or more second time slots.

Example 75: a system includes the system of Example 74. Further, the one or more second time slots are determined based on a function having at least the portion of the second identifier as an input.

Example 76: a system includes the system of Example 70. Further, the operations also include: determining, by the first wireless communications network, the one or more second time slots based on at least the portion of the second identifier; and determining, by the first wireless communications network, that the one or more first time slots, when offset by the interval of time, do not overlap with the one or more second time slots.

Example 77: a system includes the system of Example 76. Further, the one or more second time slots are determined based on a function having at least the portion of the second identifier as an input.

Example 78: a system includes the system of Example 70. Further, the first message includes an indication of only a portion of the second identifier.

Example 79: a system includes the system of Example 78. Further, the portion of the second identifier is a trailing portion of the second identifier.

Example 80: a system includes the system of Example 70. Further, the first identifier is an Fifth Generation Globally Unique Temporary Identity (5G-GUTI), and the second identifier and the third identifiers are international mobile subscriber identities (IMSIs).

Example 81: a system includes the system of Example 70. Further, the first identifier is an international mobile subscriber identity (IMSI), and the second identifier and the third identifiers are Fifth Generation Globally Unique Temporary Identities (5G-GUTIs).

What is claimed is:

1. An apparatus comprising:
   processing circuitry; and
   memory storing instructions that when executed by the processing circuitry, cause the processing circuitry to perform operations comprising:
   determining a first identifier associated with a first universal subscriber identity module (USIM) of a user equipment (UE) for use on a first wireless communications network;
   determining, based on the first identifier, one or more first time slots for monitoring the first wireless communication network for first data directed to the UE;
   determining a second identifier associated with a second USIM of the UE for use on a second wireless communications network, wherein one of the first wireless communications network or the second wireless communications network comprises an Evolved Packet System (EPS) and another one of the first wireless communications network or the second wireless communications network comprises a Fifth Generation System (5GS);
   determining, based on the second identifier, one or more second time slots for monitoring the second wireless communication network for second data directed to the UE;
   determining that the one or more first time slots at least partially overlap the one or more second time slots; and
   responsive to determining that the one or more first time slots at least partially overlap the one or more second time slots, generating, for transmission via the second wireless communications network,
   a request for a third identifier to be assigned to the UE for use on the second wireless communications network, wherein the third identifier is different from the second identifier.

2. The apparatus of claim 1, wherein the first data comprises one or more first paging messages from the first wireless communications network, and
   wherein the second data comprises one or more paging messages from the second wireless communications network.

3. The apparatus of claim 1, wherein the one or more first time slots are determined based on a first function having at least a portion of the first identifier as an input, and
   wherein the one or more second time slots are determined based on a second function having at least a portion of the second identifier as an input.

4. The apparatus of claim 1, wherein determining the second identifier comprises:
   generating a first message for transmission via the second wireless communications network, the first message comprising a request to register the UE with respect to the second wireless communications network; and
   receiving a second message via the second wireless communications network, the second message comprising:
      an indication that the request has been accepted, and
      an indication of the second identifier.

5. The apparatus of claim 1, wherein determining the second identifier comprises:
   receiving a message via the second wireless communications network, wherein the message comprises:
      an indication of a modification to a registration of the UE with respect to the second wireless communications network, and
      an indication of the second identifier.

6. The apparatus of claim 1, wherein the request for the third identifier comprises:
   an indication of at least a portion of the first identifier.

7. The apparatus of claim 1, wherein the operations further comprise:
   receiving an indication of the third identifier via the second wireless communications network;
   determining, based on the third identifier, one or more third time slots for monitoring the second wireless communication network for the second data directed to the UE;
   monitoring the first wireless communication network for the first data directed to the UE during the one or more first time slots; and
   monitoring the second wireless communication network for the second data directed to the UE during the one or more third time slots.

8. The apparatus of claim 1, wherein the operations further comprise:
   determining, based on the third identifier, one or more third time slots for monitoring the second wireless communication network for the second data directed to the UE, wherein determining the one or more third time slots comprises offsetting the one or more second time by an interval of time;
   monitoring the first wireless communication network for the first data directed to the UE during the one or more first time slots; and
   monitoring the second wireless communication network for the second data directed to the UE during the one or more second time slots.

9. The apparatus of claim 1, wherein the first identifier is an international mobile subscriber identity (IMSI), and
   wherein the second identifier and the third identifier are Fifth Generation Globally Unique Temporary Identities (5G-GUTIs).

10. The apparatus of claim 1, wherein the request for the third identifier comprises:
    an indication of only a portion of the first identifier, wherein the portion of the first identifier is a trailing portion of the first identifier.

11. The apparatus of claim 1, wherein the first identifier is a Fifth Generation Globally Unique Temporary Identity (5G-GUTI), and
    wherein the second identifier and the third identifiers are international mobile subscriber identities (IMSIs).

12. The apparatus of claim 1, the operations further comprising:
    determining that the first USIM and the second USIM are in a connected state, and
    responsive to determining that the first USIM and the second USIM are in the connected state, determining whether the one or more first time slots at least partially overlap the one or more second time slots.

13. The apparatus of claim 1, the operations further comprising:
    determining that neither of the first USIM nor the second USIM is in a detached state or a limited service state, and
    responsive to determining that neither of the first USIM or the second USIM is in the detached state or the limited service state, determining whether the one or more first time slots at least partially overlap the one or more second time slots.

14. An apparatus comprising:
    processing circuitry; and
    memory storing instructions that when executed by the processing circuitry, cause the processing circuitry to perform operations comprising:
       receiving a first message from a user equipment (UE) communicatively coupled to a first wireless communications network and to a second wireless communications network,
          wherein the UE has been assigned a first identifier that is associated with a first universal subscriber identity module (USIM) of the UE for use on a first wireless communications network,
          wherein the UE has been assigned a second identifier that is associated with a second USIM of the UE for use on the second wireless communications network,
          wherein one of the first wireless communications network or the second wireless communications network comprises an Evolved Packet System (EPS) and another one of the first wireless communications network or the second wireless communications network comprises a Fifth Generation System (5GS),
          wherein the first message is indicative of a paging collision between (i) one or more first time slots for monitoring the first wireless communication network by the UE for first data directed to the UE, and (ii) one or more second time slots for monitoring the second wireless communication network by the UE for second data directed to the UE, and
          wherein the first message comprises
             a request for a third identifier to be assigned to the UE for use on the first wireless communications network, wherein the third identifier is different from the first identifier; and
       responsive to receiving the first message, generating a second message for transmission to the UE, wherein the second message comprises
          an indication of the third identifier.

15. The apparatus of claim 14, wherein the first message comprises an indication of at least a portion of the second identifier, and
    wherein the operations further comprise:
       determining the one or more second time slots based on at least the portion of the second identifier, and
       determining the first identifier based on the one or more second time slots, wherein the one or more second time slots are determined based on a function having at least the portion of the second identifier as an input.

16. The apparatus of claim 14, further comprising:
determining the one or more second time slots based on at least a portion of the second identifier, and
determining that the one or more first time slots, when offset by an interval of time, do not overlap with the one or more second time slots,
wherein the one or more second time slots are determined based on a function having at least the portion of the second identifier as an input.

17. The apparatus of claim 14, wherein the first identifier is a Fifth Generation Globally Unique Temporary Identity (5G-GUTI), wherein the second identifier and the third identifiers are international mobile subscriber identities (IMSIs).

18. The apparatus of claim 14, wherein the first identifier is an international mobile subscriber identity (IMSI), and wherein the second identifier and the third identifiers are Fifth Generation Globally Unique Temporary Identities (5G-GUTIs).

19. A method comprising:
determining a first identifier associated with a first universal subscriber identity module (USIM) of a user equipment (UE) for use on a first wireless communications network;
determining, based on the first identifier, one or more first time slots for monitoring the first wireless communication network for first data directed to the UE;
determining a second identifier associated with a second USIM of the UE for use on a second wireless communications network, wherein one of the first wireless communications network or the second wireless communications network comprises an Evolved Packet System (EPS) and another one of the first wireless communications network or the second wireless communications network comprises a Fifth Generation System (5GS);
determining, based on the second identifier, one or more second time slots for monitoring the second wireless communication network for second data directed to the UE;
determining that the one or more first time slots at least partially overlap the one or more second time slots; and
responsive to determining that the one or more first time slots at least partially overlap the one or more second time slots, generating, for transmission to the second wireless communications network,
a request for a third identifier to be assigned to the UE for use on the second wireless communications network, wherein the third identifier is different from the second identifier.

\* \* \* \* \*

UNITED STATES PATENT AND TRADEMARK OFFICE
CERTIFICATE OF CORRECTION

PATENT NO. : 12,089,180 B2
APPLICATION NO. : 17/441209
DATED : September 10, 2024
INVENTOR(S) : Alexandre Saso Stojanovski et al.

It is certified that error appears in the above-identified patent and that said Letters Patent is hereby corrected as shown below:

In the Claims

Column 62, Line 30, Claim 1, please delete "communication network" and insert therefore -- communications network --;

Column 62, Line 43, Claim 1, please delete "communication network" and insert therefore -- communications network --;

Column 63, Line 29, Claim 7, please delete "communication network" and insert therefore -- communications network --;

Column 63, Line 31, Claim 7, please delete "communication network" and insert therefore -- communications network --;

Column 63, Line 34, Claim 7, please delete "communication network" and insert therefore -- communications network --;

Column 63, Line 41, Claim 8, please delete "communication network" and insert therefore -- communications network --;

Column 63, Line 45, Claim 8, please delete "communication network" and insert therefore -- communications network --;

Column 63, Line 48, Claim 8, please delete "communication network" and insert therefore -- communications network --;

Column 64, Line 45, Claim 14, please delete "communication network" and insert therefore -- communications network --;

Column 64, Line 48, Claim 14, please delete "communication network" and insert therefore Signed and Sealed this
Twenty-ninth Day of October, 2024

Katherine Kelly Vidal
*Director of the United States Patent and Trademark Office*

-- communications network --;

Column 66, Line 2, Claim 19, please delete "communication network" and insert therefore
-- communications network --;

Column 66, Line 15, Claim 19, please delete "communication network" and insert therefore
-- communications network --.